US009868067B2

(12) United States Patent
Fujimoto

(10) Patent No.: US 9,868,067 B2
(45) Date of Patent: Jan. 16, 2018

(54) GAME CONTROL DEVICE, GAME CONTROL METHOD, NON-TRANSITORY COMPUTER-READABLE RECORDING MEDIUM, AND GAME SYSTEM

(71) Applicant: KONAMI DIGITAL ENTERTAINMENT CO., LTD., Minato-ku, Tokyo (JP)

(72) Inventor: Eisaku Fujimoto, Kashiwa (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 226 days.

(21) Appl. No.: 14/387,187

(22) PCT Filed: Dec. 19, 2012

(86) PCT No.: PCT/JP2012/008125
§ 371 (c)(1),
(2) Date: Sep. 22, 2014

(87) PCT Pub. No.: WO2013/140481
PCT Pub. Date: Sep. 26, 2013

(65) Prior Publication Data
US 2015/0050986 A1 Feb. 19, 2015

(30) Foreign Application Priority Data
Mar. 23, 2012 (JP) .................. 2012-066735

(51) Int. Cl.
*A63F 13/00* (2014.01)
*A63F 13/833* (2014.01)
(Continued)

(52) U.S. Cl.
CPC ............ *A63F 13/833* (2014.09); *A63F 13/58* (2014.09); *A63F 13/79* (2014.09);
(Continued)

(58) Field of Classification Search
CPC .......... A63F 13/34; A63F 13/45; A63F 13/48; A63F 13/79; A63F 13/795
(Continued)

(56) References Cited

U.S. PATENT DOCUMENTS

| 2007/0087799 A1* | 4/2007 | Van Luchene .......... A63F 13/12 463/1 |
| 2011/0252238 A1* | 10/2011 | Abuan ................ H04L 61/2575 713/168 |
| 2013/0059663 A1* | 3/2013 | Kurlancheek ............. A63F 9/24 463/42 |

FOREIGN PATENT DOCUMENTS

| JP | 4550911 A | 9/2010 |
| JP | 2011-062258 A | 3/2011 |
| JP | 2011-083597 A | 4/2011 |

OTHER PUBLICATIONS

International Search Report in PCT/JP2012/008125 dated Mar. 12, 2013.
(Continued)

*Primary Examiner* — James S McClellan
(74) *Attorney, Agent, or Firm* — Global IP Counselors, LLP

(57) ABSTRACT

A game control device includes an associator configured to associate a game-playing user with one or more users; a game executor configured to execute a game for the game-playing user; a determiner configured to determine whether a progression degree of the game made by the one or more users satisfies a condition; and an effect provider configured to provide the game-playing user with an advantageous effect if it is determined by the determiner that the condition has been satisfied.

10 Claims, 18 Drawing Sheets

(51) Int. Cl.
*A63F 13/79* (2014.01)
*A63F 13/58* (2014.01)
(52) U.S. Cl.
CPC ..... *A63F 2300/556* (2013.01); *A63F 2300/61* (2013.01); *A63F 2300/65* (2013.01)
(58) Field of Classification Search
USPC .................................................... 463/31, 42
See application file for complete search history.

(56) References Cited

OTHER PUBLICATIONS

Appli Style, vol. 2, (Eastpress Co.,Ltd.), p. 26-p. 27, dated May 23, 2011.
Famitsu Connect! On dated Mar. 13, 2010, vol. 40, pp. 128-131.
Office Action in the corresponding Japanese Patent Application No. 2013-144369 dated Jun. 23, 2015.

* cited by examiner

Communication terminal 10

| User ID | 000001 |
|---|---|
| Access log | Login time : XXXX<br>Access time : XXXX<br>Access time : XXXX<br>Access time : XXXX<br>⋮ ⋮ |
| User name/<br>Display image | KNM | xxx.jpg |
| Level | Lv38 |
| Stamina | 113 |
| Friendship point | 100 |
| User ID of friends | 012345, ⋯ |
| Data of owned cards | Warrior card | Image | Attack power |
| | WR080 | xxx.jpg | 200 |
| | WR121 | xxx.jpg | 320 |
| | ⋮ | ⋮ | ⋮ |

User database

FIG.6

| Stage | Monster Character | Image | HP |
|---|---|---|---|
| 1 | MC1 |  | 1500 ~ 2000 |
| 2 | MC2 |  | 1500 ~ 2000 |
| 3 | MC3 |  | 1500 ~ 2000 |
| ⋮ | ⋮ | ⋮ | ⋮ |

Monster character data

| Variable M | Increase in variable M |
|---|---|
| 0 | 3 |
| 1 | 3 |
| 2 | 3 |
| 3 | 2 |
| 4 | 2 |
| 5 | 2 |
| 6 | 2 |
| 7 | 1 |
| 8 | 1 |
| 9 | 1 |
| 10 | 0 |

Variable adjustment data

FIG.14

| Variable M | Rate of increase in attack power | Attack power correction factor (K) | Level of increase in attack power |
|---|---|---|---|
| 0 | 0% | 1 | 0 |
| 1 ~ 2 | 5% | 1.05 | 1 |
| 3 ~ 5 | 7% | 1.07 | 2 |
| 6 ~ 7 | 10% | 1.10 | 3 |
| 8 ~ 9 | 12% | 1.12 | 4 |
| 10 | 25% | 1.25 | 5 |

Attack power correction data

FIG.15

GAME CONTROL DEVICE, GAME CONTROL METHOD, NON-TRANSITORY COMPUTER-READABLE RECORDING MEDIUM, AND GAME SYSTEM

CROSS-REFERENCE TO RELATED APPLICATION

The present invention is based upon and claims the benefit of priority of the prior Japanese Patent Application No. 2012-066735, filed on Mar. 23, 2012, the entire contents of which are incorporated herein by reference.

FIELD

The present invention relates to a technique for controlling a progress of a game for respective users.

BACKGROUND

Recently, so-called social network games have become widespread which run on game applications created on the basis of operating environments such as application programming interfaces (API) operated on a web browser in a social networking service (SNS) provided by a particular service provider. Social network games may be defined as a type of online game played among a plurality of unspecified users who are communicating with each other. A user who has a communication terminal connectable to the Internet and with a web browser installed is able to enjoy social network games regardless of time or location.

One characteristic of the abovementioned social network game is that communication functions for socializing between users are more sophisticated than those of conventional online games. For example, in social network games, besides collaborative play with other users (friends), users exchange information through communication with friends such as greetings and contacts, and give or exchange items in the game with friends. In the digital card game (Dragon collection (registered trademark)) disclosed in a Japanese game magazine (Appli Style, Vol. 2 (Eastpress Co., Ltd.) p. 26-27.), items are distributed to respective users based on a number of login users.

SUMMARY OF THE INVENTION

Some conventional social network games applies a method to execute a game cooperatively among users (friends) who are associated with each other. With this method, a user obtains an item in a game at randomly-defined time while playing the game. With this method, it is configured such that if the user (game-playing user) sends the item to his or her friend(s), the user and his or her friend(s) are provided with an advantageous effect in the game. However, with this conventional method, a main purpose of playing the game for the game-playing user is to progress the game, and the item that the game-playing user can send to his or her friends is randomly obtainable during progressing the game. Thus, the user cannot realize that he or she progresses the game cooperatively with the friends. For example, the user is less likely to be motivated to progress the game primarily for the purpose of helping the friends.

The present invention has been devised in consideration of the above. An object of the present invention is to provide a game control device, a game control method, a program, a recording medium, and a game system that allow a game-playing user to realize that the game-playing user progresses a game cooperatively with the other users (friends) who are associated with the game-playing user.

An aspect of the present invention is a game control device including:
an associator configured to associate a game-playing user with one or more users;
a game executor configured to execute a game for the game-playing user;
a determiner configured to determine whether a progression degree of the game made by the one or more users satisfies a condition; and
an effect provider configured to provide the game-playing user with an advantageous effect if it is determined by the determiner that the condition has been satisfied.

In this game control device, the game includes a plurality of parts, and the condition is that execution results each satisfy a criterion for a predetermined number of parts, the predetermined number of parts being configured to be played by any one of the one or more users.

In this game control device, the effect provider may be configured to enhance the advantageous effect as a number of parts increases, the number of parts depending on the execution results that each satisfy the criterion, the number of parts being configured to be played by any one of the one or more users.

In this game control device, the game may include a plurality of parts, and the condition is that execution results each satisfy a criterion for a total number of parts, the total number of parts being configured to be played by the one or more users.

In this game control device, the effect provider may be configured to enhance the advantageous effect as the total number of parts increases, the total number of parts depending on the execution results that each satisfy the criterion, the total number of parts being configured to be played by the one or more users.

The game control device may further include a degree of intimacy obtainer configured to obtain a degree of intimacy between the gaming-play user and the one or more users associated by the associator,
wherein the condition is modified based on the degree of intimacy between the game-playing user and the one or more users associated with the game-playing user, the degree of intimacy between the game-playing user and the one or more users associated with the game-playing user being obtained by the degree of intimacy obtainer.

The game control device may further include a notifier configured to notify the game-playing user that the condition has been satisfied if it is determined by the determiner that the condition has been satisfied.

BRIEF DESCRIPTION OF THE DRAWING

Referring now to the attached drawings which form a part of this disclosure:

FIG. 6 illustrates an exemplary configuration of a user database that is included in the database server.

FIG. 14 illustrates an example of configuration of variable adjustment data indicating an increase of a variable based on notification from a friend.

FIG. 15 illustrates an example of configuration of attack power correction data indicating attack power correction factors that are applied in a battle.

DETAILED DESCRIPTION OF THE EMBODIMENTS

The embodiment of the present embodiment will be described below.

(1) Configuration of game system

Figure 1:
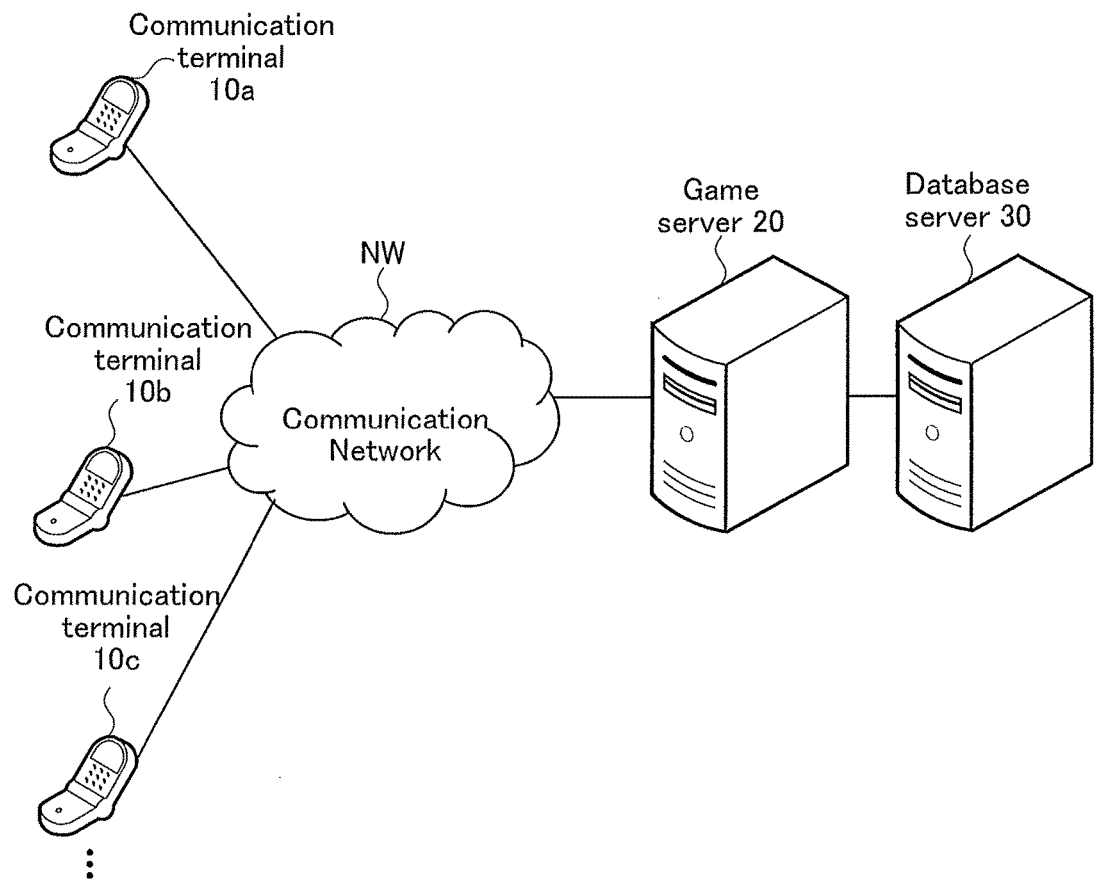
FIG. 1 illustrates a basic configuration diagram of a game system according to an embodiment.

FIG. 1 illustrates an exemplary system configuration of a game system according to embodiments. As illustrated in FIG. 1, the game system includes a plurality of communication terminals 10*a*, 10*b*, 10*c* and etc. that are connectable to a communication network NW such as the Internet, a game server 20 that is connectable to the communication network NW, and a database server 30. Each of the communication terminals 10*a*, 10*b*, 10*c* and etc. is a communication terminal operated by an individual user, such as a mobile terminal, a smartphone, a personal digital assistant (PDA), a personal computer, or a television receiver including a two-way communication function (including a so-called multi-functional smart TV). It should be noted that the communication terminals 10*a*, 10*b*, 10*c* and etc. may be hereinafter collectively referred to as "communication terminal(s) 10."

With this game system, the game server 20 is configured to be able to communicate with the communication terminal 10 as a client. The game server 20 provides gaming service with the communication terminal 10. The game server 20 is embedded with an application operable on a web browser as a game application in the game system. The database server 30 stores a variety of information for executing the games as described below. The database server 30 is connected to the game servers 20 by means of a wired connection for example for reading and writing the information.

The communication terminal 10 includes a web browser that is able to display a web page provided by the game server 20. A user plays a game by performing an operation on the web page displayed on the communication terminal 10.

In addition to the game server 20, an authentication server may be provided for authenticating respective users of the communication terminals 10, although not illustrated in FIG. 1. Further, if providing a plurality of the game servers 20 for receiving accesses from a large number of the communication terminals 10, a load balancer may be provided for regulating loads among the plurality of game servers 20. Furthermore, the game server 20 may be configured as a single server device or as a plurality of server devices to which functions are distributed.

(2) Communication terminal configuration

The communication terminal 10 will be hereinafter explained with reference to FIGS. 2A, 2B, and 3.

Figure 2A:
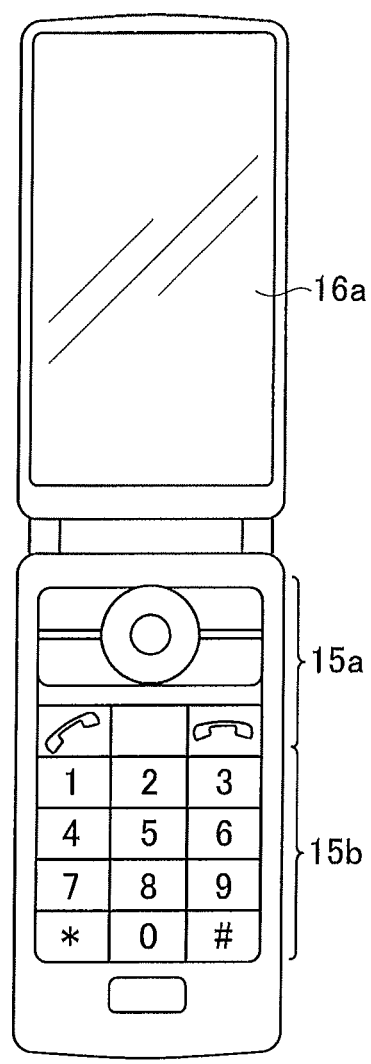
FIG. 2A illustrates an external appearance example of a communication terminal according to the embodiment.
Figure 2B:
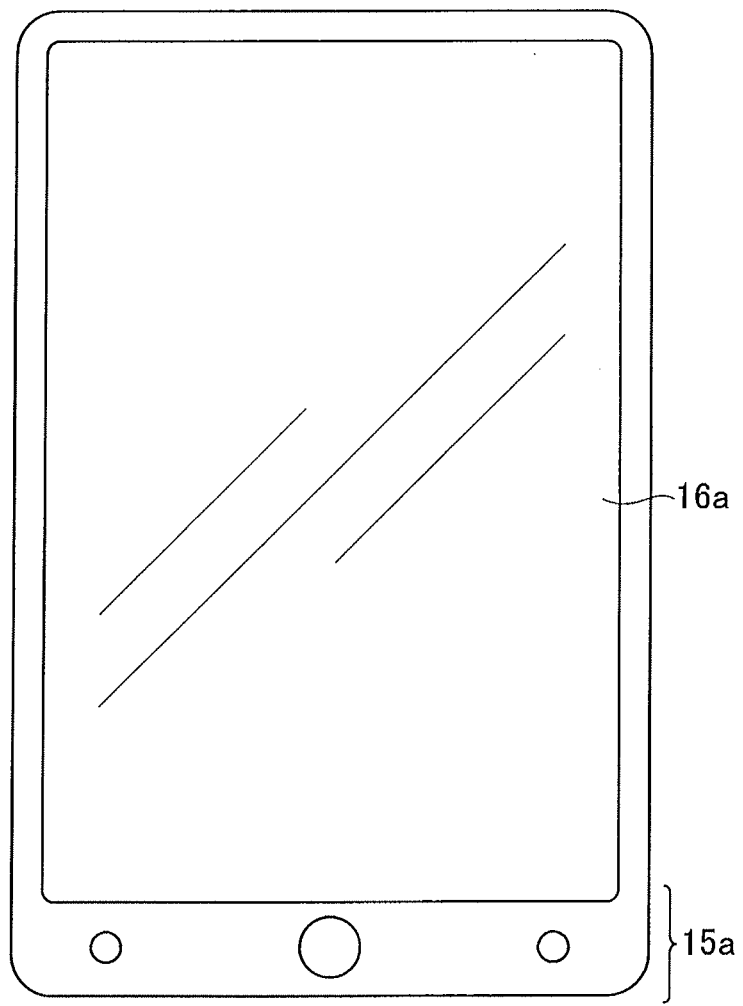
FIG. 2B illustrates an external appearance example of a communication terminal according to the embodiment.

FIGS. 2A and 2B illustrate exemplary appearances of the communication terminal 10. FIG. 2A illustrates a communication terminal with a button input system such as a foldable communication terminal (mobile telephone). FIG. 2B illustrates a communication terminal with a touch panel input system such as a smartphone. FIG. 3 is a configuration block diagram of the communication terminal 10.

Figure 3:
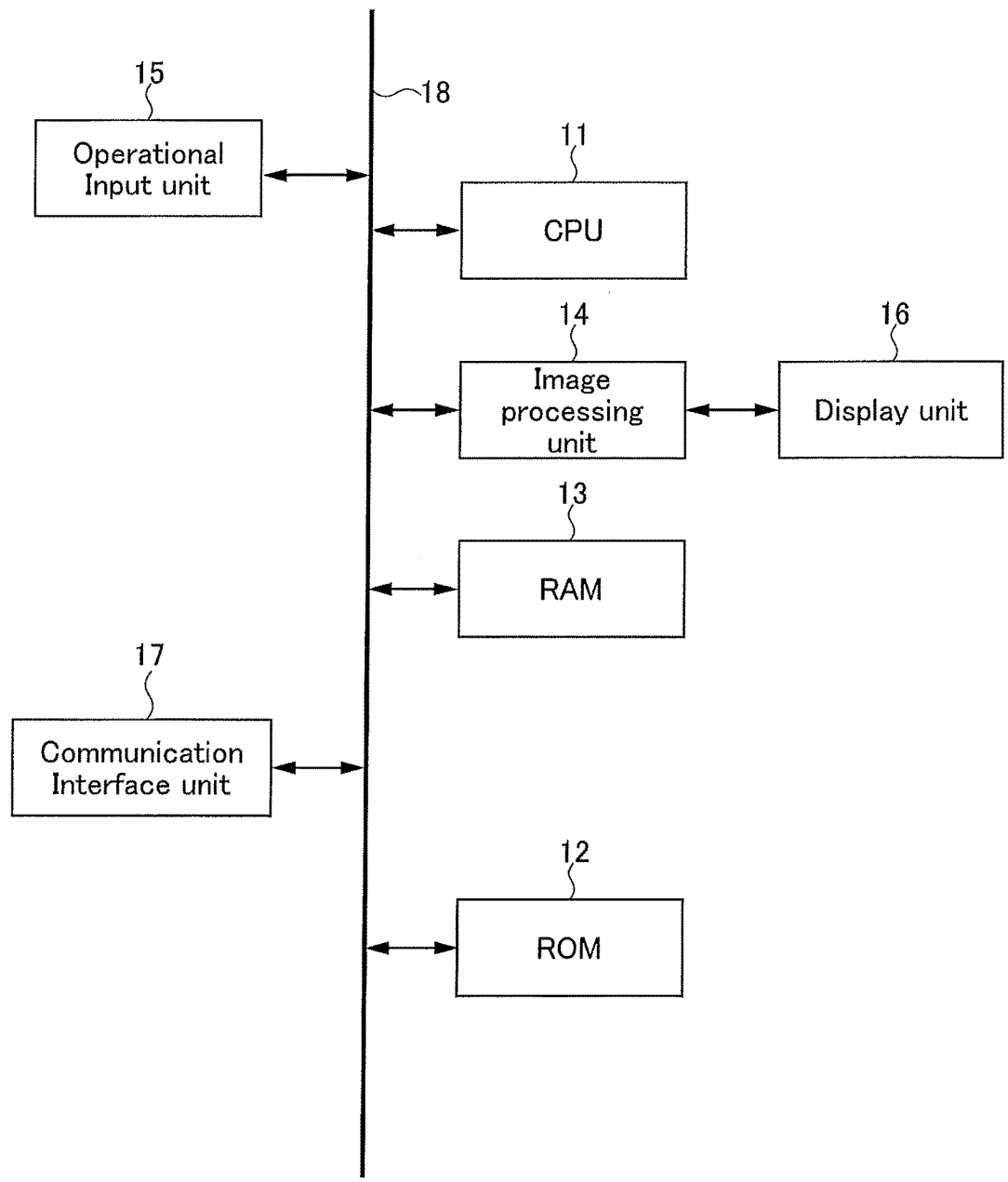
FIG. 3 is a block diagram of a configuration of a communication terminal according to the embodiment.

As represented in FIG. 3, each communication terminal 10 includes a central processing unit (CPU) 11, a read-only memory (ROM) 12, a random access memory (RAM) 13, an image processing unit 14, an operational input unit 15, a display unit 16, and a communication interface unit 17 as a signal reception unit. Further, each communication terminal 10 includes a bus 18 for transmitting control signals or data signals among the components.

The CPU 11 loads a web browser stored in the ROM 12 into the RAM 13 and runs the web browser therein. The CPU 11 acquires data for displaying a web page from the game server 20 through the communication interface unit 17 on the basis of an appropriately specified uniform resource locator (URL) that is inputted by a user using the operational input unit 15 and the like. The acquired data is data of objects such as images associated with a hypertext markup language (HTML) document and the HTML document (hereinafter collectively referred to as "HTML data" on an as-needed basis). The CPU 11 then interprets the acquired HTML data. It should be noted that each communication terminal 10 may be embedded with a variety of plug-ins for extending browsing functions of the web browser.

In acquiring the HTML data, the CPU 11 transmits an access request message to the game server 20 through the communication interface unit 17. The access request message herein includes either a preliminarily registered user ID (user identification information) or a user ID inputted through the operational input unit 15.

The web browser displays on the display unit 16 a web page provided by the game server 20 through the image processing unit 14 on the basis of the acquired HTML data. Further, when either a Hyperlink or a button on the web page is selected by a user operating the operational input unit 15, the web browser sends a request to the game server 20 (that is, a request for updating a web page; HTTP request) to transmit new HTML data for displaying the web page in accordance with the selection.

The image processing unit 14 displays a web page on the display unit 16 on the basis of image data for display to be provided from the CPU 11 as an analysis result of the HTML data. For example, the display unit 16 is a liquid crystal display (LCD) monitor including thin-film transistors arranged in a matrix manner on a pixel-by-pixel basis. The display unit 16 displays the image of the web page by driving the thin-film transistors on the basis of the image data for display on a display screen 16a.

In the case in which the mobile terminal 10 is a communication terminal to which a button input method (see FIG. 2A) applies, the operational input unit 15 is equipped with a button group 15a and a button group 15b. The button group 15a includes a plurality of operational input buttons such as a directional instruction button and a confirmation button for receiving user operational inputs. The button group 15b includes a plurality of operational input buttons such as an alphanumeric keypad and the like. The operational input unit 15 also includes an interface circuit for recognizing pressing (operating) the buttons as inputs and outputting the inputs to the CPU 11. For example, the direction instructional button is provided for instructing the CPU 11 to scroll and display a web page displayed on the display unit 16. The confirmation button is provided for instructing the CPU 11 to select one of a plurality of hyperlinks or buttons displayed on a web page. The selected hyperlink or button may be activated (e.g., highlighted). When the communication terminal 10 is a small portable terminal, the aforementioned buttons are preferably disposed on the front face of the communication terminal 10 to allow a user to easily operate (click) the buttons with the thumb of the hand holding the communication terminal 10. In the example illustrated in FIG. 2A, the button group 15b is arranged below the button group 15a and includes a plurality of operational input buttons depicted as "0" to "9", "*", "#" (an alphanumeric keypad).

In the case in which the mobile terminal 10 is a communication terminal to which a touch panel input method (see FIG. 2B) applies, the operational input unit 15 receives touch panel method inputs inputted by mainly touching the display screen 16a with a finger or a pen. The touch panel input method may be a known method such as a capacitance method. As illustrated in FIG. 2B, the communication terminal 10 may be provided with a button group 15a despite having the touch panel input method.

In the case in which a button input method applies to the mobile terminal 10 for example, a selection operation of a button on a web page displayed on the communication terminal 10 is performed by the following steps: selecting a button with a pressing operation of the direction instructional button and subsequently confirming the selected button with a pressing operation of the confirmation button. In the case in which a touch panel input method applies to the mobile terminal 10 for example, the selection operation is conducted by indicating (touch operation) with a finger or pen a position of a button on the display screen 16a on which the web page is displayed.

(3) Game server configuration

Figure 4:
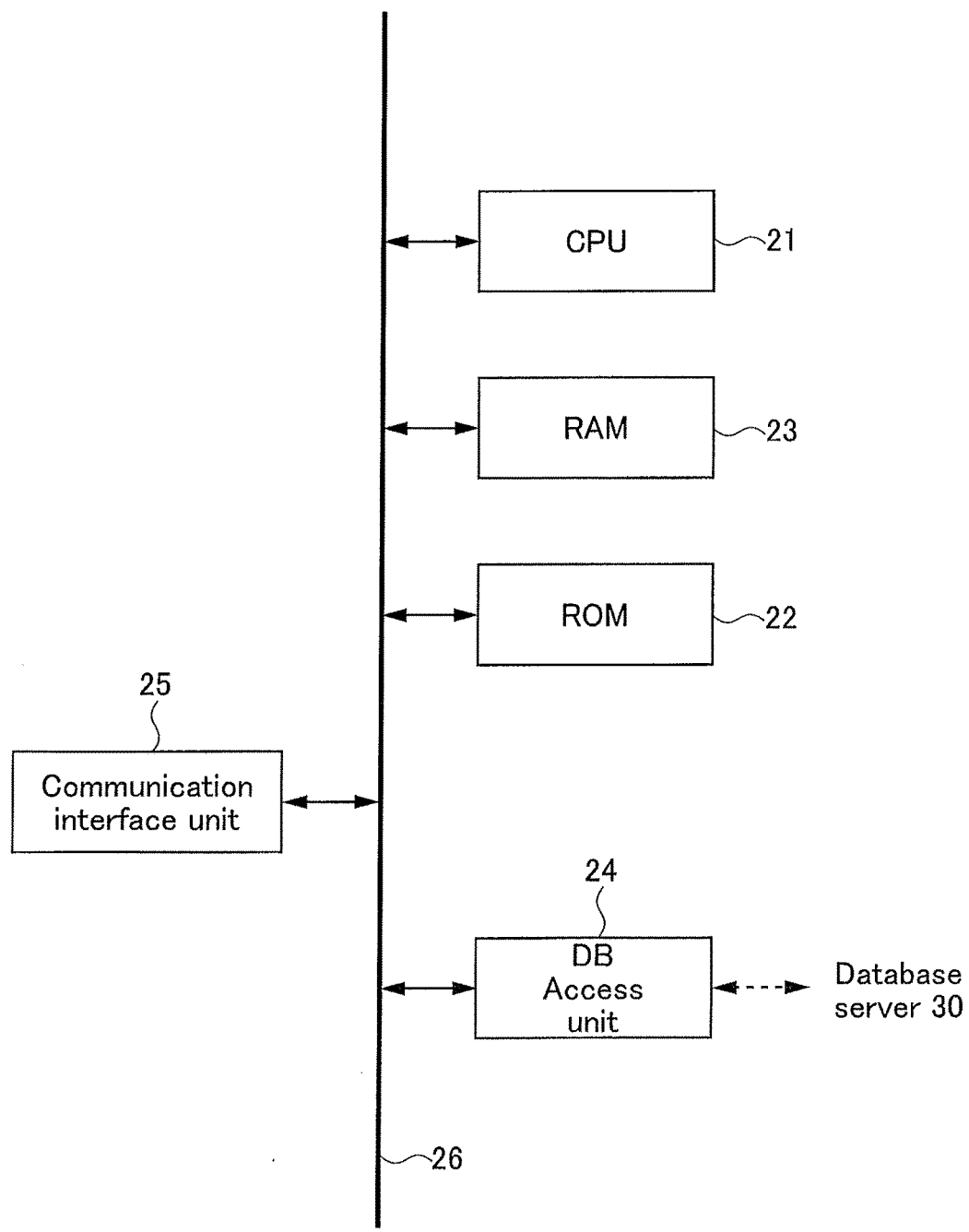
FIG. 4 is a block diagram of a configuration of a game server according to the embodiment.

The configuration of the game server 20 will be explained with reference to FIG. 4

For example, the game server 20 manages a website of a game including a plurality of hierarchically structured web pages. The game server 20 provides a web service of the game to the communication terminals 10. As illustrated in FIG. 4, the game server 20 includes a CPU 21, a ROM 22, a RAM 23, a database (DB) access unit 24, and a communication interface unit 25. Further, the game server 20 includes a bus 26 for transmitting control signals or data signals among the components. It should be noted that the game server 20 may have the same hardware structure as general-purpose web servers.

The ROM 22 stores an application program that provides the service of displaying a HTML document and objects such as images (i.e., displaying a web page) to the web browser of the communication terminal 10 as a client. A variety of data referenceable by the CPU 21 is stored in the ROM 22 in addition to the application program.

The CPU 21 loads a game program stored in the ROM 22 into the RAM 23 and runs the loaded game program. The CPU 21 also performs a variety of processing through the communication interface unit 25.

For example, the CPU 21 transmits HTML data to the communication terminal 10 through the communication interface unit 25. Moreover, the CPU 21 performs authentication processing when the game server 20 performs authentication processing of the user of the communication terminal 10.

The CPU 21 performs processing in accordance with the hyperlink or button selected by the user on the web page displayed on the communication terminal 10 through the communication interface unit 25. The processing includes, for example, transmitting new HTML data, calculating or data processing in the game server 20.

The database access unit 24 is an interface used when the CPU 21 performs data reading and data writing with respect to the database server 30.

(4) Database server configuration

The database server 30 as a memory device can be realized by a general-purpose storage such as a high-capacity hard disc drive, a redundant array of inexpensive disks (RAID) or other form of device. Databases inside the database server 30 are configured to allow reading and writing of data by the CPU 21 through the database access unit 24 of the game server 20.

Figure 5:
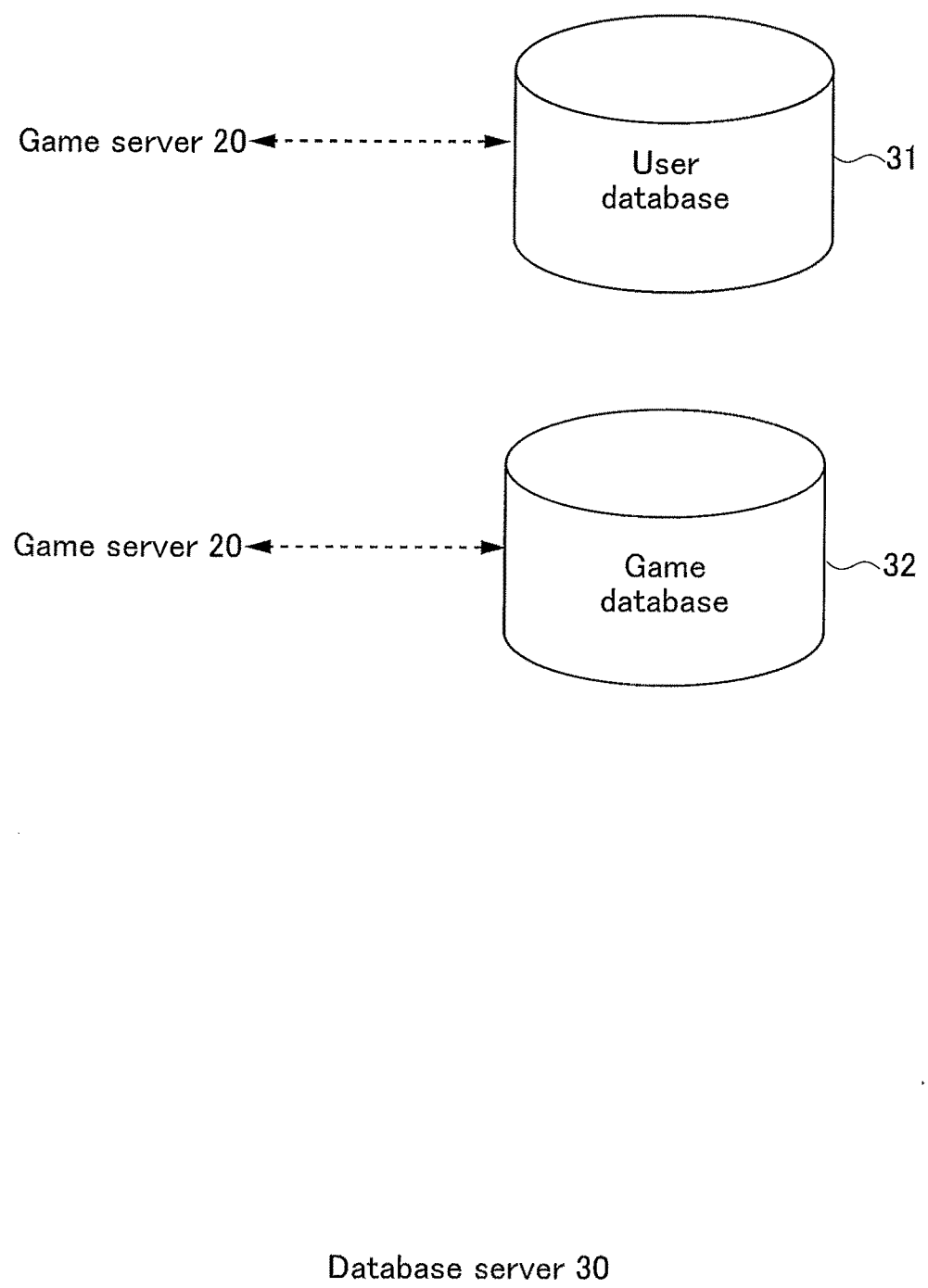
FIG. 5 is a block diagram of a configuration of a database server according to the embodiment.

FIG. 5 illustrates an example of a database server 30 configuration. As illustrated in FIG. 5, the database server 30 includes a user database 31 and a game database 32.

The game executed by the game server 20 of the present embodiment is not limited to a game of a specific type. For convenience sake of the following explanation, a battle-type digital card game will be considered as an exemplary game. The battle-type digital card game may be referred to as "the game of the present embodiment" hereinafter. The battle-type digital card is configured such that a user plays a battle against monster characters by use of warrior card(s) that the user virtually owns in the game. The monster characters are monsters in the game.

FIG. 6 illustrates an exemplary configuration of a user database 31 that is applied to the game of the present embodiment. In this example, the user database 31 includes for each user ID (user identification information): Access log, User Name/Display Image, Skill level, Stamina, Friendship points, User ID of friends, and Data of owned cards. Information included in the user database 31 may be updated by the game server 20.

In the following explanation, data for each user ID or for each user name (which is explained below) that identifies a user included in the user database 31 is referred to collectively as "user data." The data of the fields that configure the user data are described below.

—Access Log

"Access log" includes a login time that is a time when a user logins based on a user ID, or an access time that is a time when a user accesses based on a user ID.

—User Name/Display Image

"User Name/Display Image" represents a user name and a display image displayed for identifying a user of the communication terminal 10 while executing the game. The user name is a text of a certain length or less specified in advance by the user. The display image is, for example, an avatar image selected in advance by the user. The user name is a name to identify a user in a network environment (or a game community) provided by the game server 20.

—Skill level

"Skill level" indicates a skill level of a user in the game. The skill level is a value that ranges from level 1 (Lv1) to level 100 (Lv100) for example.

—Stamina

"Stamina" is points that are required when a user plays a battle between warrior card(s) and a monster character. The stamina is a value that decreases by performing one time attack against the monster character and recovers (increases) each time a certain period of time elapses.

—Friendship points

"Friendship points" is points that a user obtains by sending a cheering message to his or her friend.

—User Id of friends

"User ID of friends" indicates user ID(s) of friends of a user (that is, user ID(s) of the other users who are associated with the user).

—Data of owned cards

"Data of owned cards" is data of warrior card(s) that a user owns. As illustrated in FIG. 6, "data of owned cards" includes image and parameters such as attack power for respective warrior card(s). In a battle between the warrior card(s) and the monster character, the warrior card(s) cause damage to the monster character in accordance with respective values of the attack power.

Referring now back to FIG. 5, the game database 32 stores and updates information with regard to progression of the game executed by the game server 20 and monster character data. The information with regard to progression of the game may include various types of information according to nature of the game. In the game of the present embodiment, that information includes results for battles against monster characters in each stage for respective users.

Figure 7:
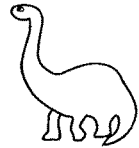
FIG. 7 illustrates an example of monster character data.
Figure 7:
Figure 7:
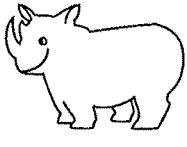

FIG. 7 illustrates an example of the monster character data. The monster character data includes data of monster characters each set for different stages. The monster character data is loaded from the game database 32 to the RAM 23 for example when battle processing is initiated. In FIG. 7, an image and a value of HP (Hit Point) correspond to respective monster characters MC1, MC2, MC3, . . . that appear in different stages. HP of each monster character is in a range of 1,500 to 2,000 in FIG. 7 for example, while a default value of HP for a battle may be randomly set within the range.

(5) Game according the present embodiment

Figure 8:
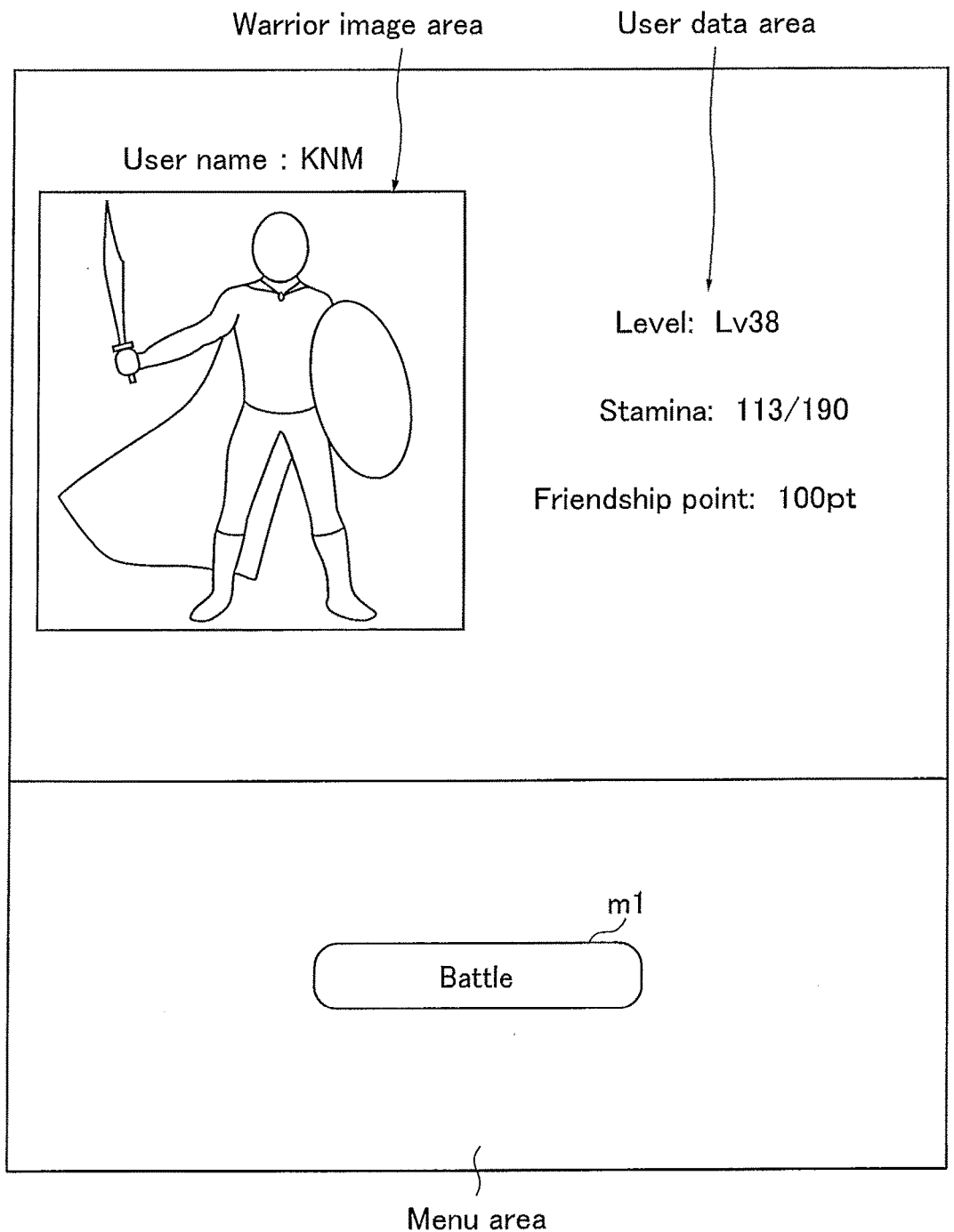
FIG. 8 illustrates a display screen of the communication terminal that displays a top page.

Specifically, battle processing in the game of the present embodiment will be described hereinafter with reference to FIGS. 8 to 12. FIG. 8 illustrates an example of a top page that is displayed on a communication terminal 10 in the game of the present embodiment. FIGS. 9 to 12 illustrate an example of web pages that are displayed on a communication terminal 10 in the battle processing.

The top page illustrated in FIG. 8 is a web page for respective user IDs. The top page illustrated in FIG. 8 includes a user data area, a warrior image area, and a menu area.

The user data area is an area in which respective fields of user data for a user ID to be processed is displayed (see FIG. 6). The displayed fields are: Level, Stamina, and Friendship points. Display of "113/190" in the field of stamina indicates that the present stamina of the user is "113" and the maximum value of the stamina is "190."

The warrior image area is an area in which image of a warrior card is displayed. A warrior card to be displayed is specified by a user among a plurality of warrior cards that are included in the user data for the user ID to be processed.

The menu area is an area for displaying a plurality of buttons that includes a button m1 for initiating the battle processing in the game of the embodiment. Buttons other than the button m1 are not shown in FIG. 8.

The updated web page P1 is displayed in response to a selection operation to the button m1 on the top page of FIG. 8. The web page P1 is configured such that a user plays a battle to defeat a monster character by use of warrior card(s) of the user while consuming the stamina. The web page P1 is initially displayed when the battle processing for a stage 1 is performed. The web page P1 includes: an area 200 for displaying a monster character that is an opponent in the battle (a monster character MC1 in the stage 1); a gauge 201 for displaying a level of damage in percent; a gauge 202 indicating a level of increase in attack power of the warrior card(s) on steps of one to five; and a button m10 of "Attack." The gauge 201 indicates 0% when HP of the monster character (the opponent in the battle) is maximum, while the gauge 201 indicates 100% when the HP is zero. Indication of 0% in the gauge 201 means that the monster character (the opponent in the battle) has been defeated. "Level of increase in attack power" is a value indicating a degree of increase in the attack power of the warrior card(s) that the user users in the battle. As the level of increase is greater, the attack power becomes greater than a default value.

The updated web page P2 is displayed in response to a selection operation to the button m10 on the web page P1. Compared to the web page P1, the HP of the monster character has decreased and the level of damage has increased in the web page P2 due to the attack power of the warrior card(s) used in the battle and the level of increase in the attack power. Every time the button m11 is selected, the level of damage of the monster character (the opponent in the battle) increases while stamina of the user decreases. As shown in the web page P3, reaching 100% in the level of damage indicates that the monster character has been defeated and the stage 1 has been cleared.

The game of the present embodiment is configured such that the attack power of the warrior card(s) of a game-playing user increases if a friend of the game-playing user has cleared a predetermined number of stages. In the present embodiment for example, the predetermined number is five; that is, the attack power increases if the friend has defeated five monster characters. The increase in the attack power is an example of an "advantageous effect" that the game-playing user is provided with. The web page P4 is an example of a web page that is displayed when a user plays a battle against a monster character MC2 in a stage 2 by use of warrior card(s). The updated web page P5 is displayed in response to a selection operation to the button m10 on the web page P4. The web page P5 includes a text area 203 for displaying a text that a friend of the user has cleared the predetermined number of stages. Through this text, the game-playing user realizes that the specific friend has defeated five monster characters (that is, a condition has been satisfied) and consequently the attack power of the warrior card(s) has increased. In the web page P5, an example is shown in which the gauge 202 indicates that the level of increase in attack power has increased by two steps (that is, the level of increase in attack power: 0→2).

Figure 12:
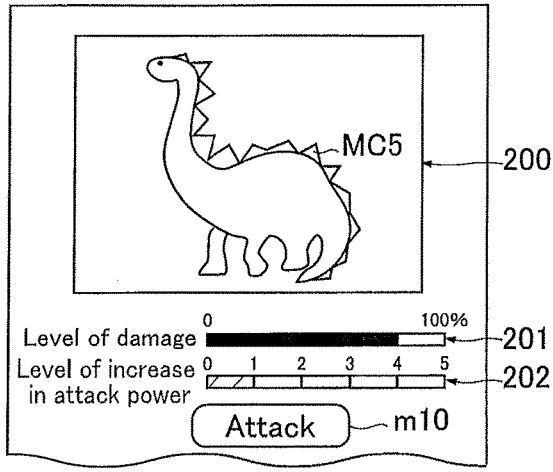
FIG. 12 illustrates an example of a series of web pages that are displayed on the communication terminal of the user.
Figure 12:
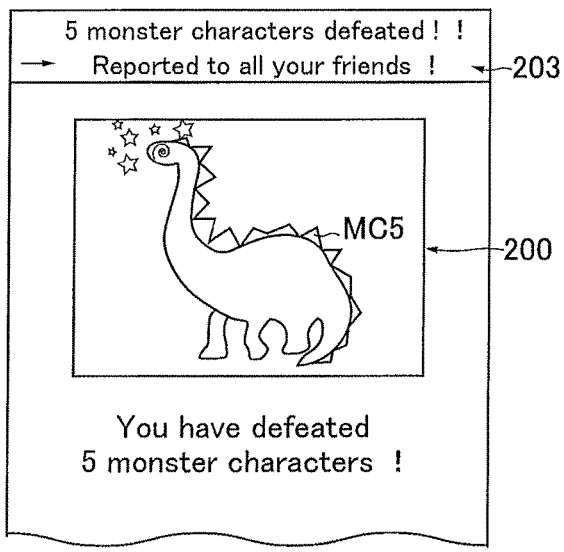
Figure 12:
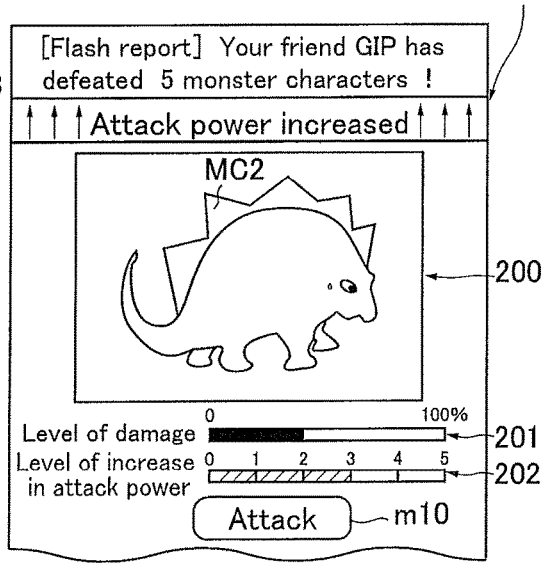

FIG. 12 illustrates a display example in the case in which a game-playing user has cleared five stages (that is, the game-playing user has defeated five monster characters) in the game of the present embodiment. Here, in response to a selection operation to the button m10 on the web page P6, the fifth monster character MC5 has been attacked and accordingly the gauge 201 indicates that the level of damage has reached 100%. Then, the updated web page P7 is displayed. The game-playing user is notified through the web page P7 that the five monster characters have been defeated and that the battle result has been reported to friend(s) of the game-playing user.

A web page P8 is an example of a web page that is displayed on the communication terminals of the friend(s) of the game-playing user. The web page P8 is displayed with defeat of the five monster characters by the game-playing user. The friend(s), who see the web page P8, recognize that the game-playing user (user KNM for example) has defeated five monster characters and attack power of warrior cards that respective friend(s) use has increased.

As described above, the game of the present embodiment is configured such that attack power of respective warrior cards of a game-playing user increases if a friend of the game-playing user has cleared a predetermined number of stages. The increase in the attack power is an example of an "advantageous effect" in the game that the game-playing user is provided with.

(6) Overview of functions of game control device

Next, respective processing in the game control device to realize the game of the present embodiment will be described.

Figure 13:
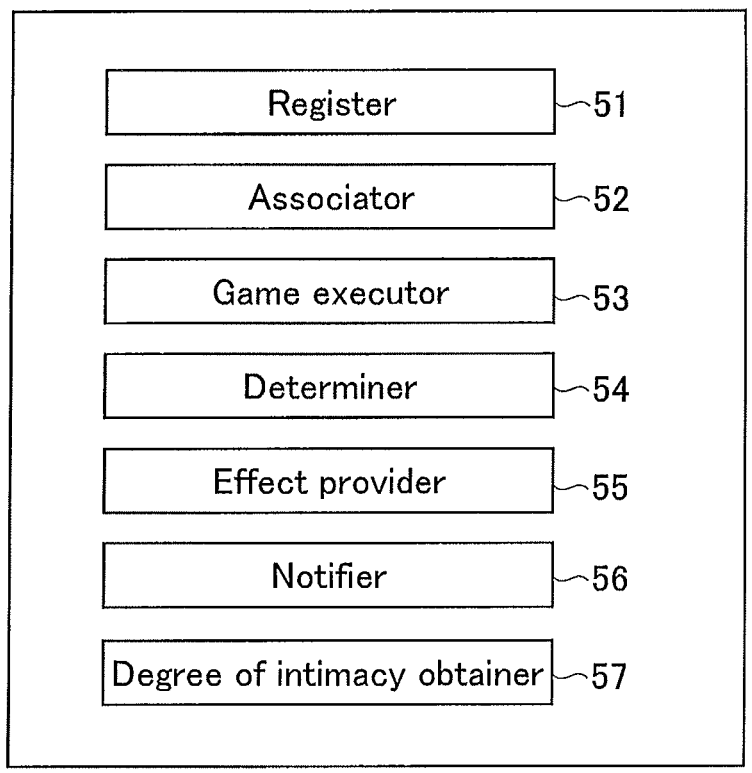
FIG. 13 is a functional block diagram for explaining functions that play main rolls in the game control device according to the embodiment.

In the present embodiment, the game control device is configured, for example, by the game server 20 and the database server 30. Hereinafter, functions performed by the game control device of the present embodiment will be described with reference to FIG. 13 in the case in which the above-described battle-type digital card game is applied. FIG. 13 is a functional block diagram for explaining functions playing main rolls in the game control device according to the present embodiment.

In the following explanation, marks and buttons and the like displayed on the web pages displayed on the communication terminal 10 are arranged in preferable positions on the web pages. The positions on the display screen of the buttons and marks and the like made visible by the communication terminal 10 may be changed with a scrolling operation of the web page by the user using a direction instructional button or touch panel operation.

The register 51 includes a function for recognizing a user request and performing registration processing in response to an operational input to the communication terminal 10 on a web page for example that is provided to the communication terminal 10. The registration processing is performed when a user is registered in the game (that is, user registration).

The function of the register 51 may be realized, for example, as described below. The CPU 21 of the game server 20 receives a registration request message from the communication terminal 10 through the communication interface unit 25. The web page provided by the game server 20 may be configured so that a registration request message is automatically generated by a certain operation (e.g., a selection of a certain button, or input of text of user ID and password, etc.) to the communication terminal 10 on the web page. Information (e.g., an IP address or an email address and the like) for identifying the communication terminal 10 that is the transmission source may be included in the registration request message. Alternatively, in the case in which the user plays the other game(s) from the same service provider, the registration request message may include the user ID of that user.

If the CPU 21 receives the registration request message in which a user ID is not included, the CPU 21 issues a new user ID and processes the new user ID, and then transmits a message to the communication terminal 10 indicating the fact that the registration processing has been completed. If the CPU 21 receives the registration request message in which a user ID is included in the registration request message, the CPU 21 processes that user ID, and then transmits a registration completion message to the communication terminal 10.

When the registration is completed, the CPU 21 prepares user data corresponding to the user ID and stores the user data in the user database 31.

The associator 52 includes a function for associating a user with other user. For example, when receiving an application based on a user ID, the associator 52 associates the user ID with the other user ID as friends.

The function of the associator 52 will be realized for example as described below. The CPU 21 of the game server 20 receives an application message (application) that specifies a user ID (or the corresponding user name) to desirably be friends with, from the communication terminal 10 of the user corresponding to a certain user ID through the communication interface unit 25. The transmission of the application message may be preset as a function of the web page provided to the communication terminal 10 of the user. Upon receiving the application message, the CPU 21 transmits HTML data to the communication terminal 10 corresponding to the user ID, when access occurs based on the user ID included in the application message. The transmitted HTML data is for displaying a web page to request for replying whether or not the application on the basis of the other user ID is approved. The CPU 21 registers both users as friends if a message of approval of the application is returned. Specifically, the CPU 21 writes the data in the "friend" field (see FIG. 6) of the user data of the two corresponding user IDs in the user database 31.

A condition under which users are associated with each other is not limited to one that requires application and approval, which is described above. Users may be registered as friends (that is, users who are associated with each other in the game) when they play an identical stage or area of an identical game or when they play a battle together. Alternatively, users who transmits greeting messages to each other at predetermined times may be automatically registered as friends. If a battle play is embedded in a game, users who play battles together at predetermined times may be automatically registered as friends.

Users may be registered as friends when they play an identical stage or area of a game or when they play a match together. Alternatively, users who transmit greeting messages to each other at predetermined times may be automatically registered as friends. If a battle play is embedded in a game, users who play battles together at predetermined times or users who play a battle cooperatively against an opponent character may be automatically registered as friends.

In the case in which a group (guild, etc.) of users is set in a game, after participation of a user (referred to as "User_A") in a group is approved, user ID of the other user (referred to as "User_B") in the group may be written in user data of User_A while user ID of User_A may be written in user data of User B.

In the present embodiment, an example is disclosed in which registration of users as friends is realized by writing data into the user database 31; however, registration of users as friends is not limited to such example. Data with regard to friends may be written to an external memory device in the network accessible from the game server 20.

The game executor 53 includes a function for performing login authentication for respective users and managing access time (that is, time of access for performing battle processing in the game or performing battle processing of a specific stage in the game). The function of the game executor 53 will be realized as described below. When receiving a HTTP request from the communication terminal 10 of the respective users, the CPU 21 of the game server 20 performs authentication processing and updates information with regard to login status. In the authentication processing, the CPU 21 collates identification information, or a user ID and a password included in the HTTP request, with identification information, or a user ID and a password recorded in the user data of the user database 31. Further, the CPU 21 accesses to the user data to update data in the field of "Access log."

The game executor 53 includes a function for causing the communication terminal 10 to display buttons to which processing performed in the game are allocated. Specifically, the CPU 21 generates HTML data for displaying a web page that includes the buttons, and transmits the HTML data to the communication terminal 10.

The function of the game executor 53 will be realized as described below in the case in which the top page of FIG. 8 is displayed on the communication terminal 10 of the user. The CPU 21 of the game server 20 accesses to the user database 31 through the database access unit 24, and reads out data of respective fields included in the user data area and image data of a warrior card to be displayed in the warrior image area. Then, the CPU 21 generates HTML data such that the top page of FIG. 8 is displayed, and transmits the HTML data to the communication terminal 10. The generated HTML data differs for respective users (that is, respective user IDs). The communication terminal 10 interprets the HTML that it receives, and displays the image of the top page on the display unit 16 (display screen 16a).

The CPU 21 performs battle processing in response to a selection operation of the user to the button m1 on the top page. The battle processing with regard to a battle against a monster character will be described hereinafter.

[Battle processing with regard to a battle against a monster character]

In the battle processing with regard to the battle against the monster character, the CPU 21 of the game server 20 obtains a selection result of a predetermined number of warrior cards that participate in the battle in response to an appropriate operation. The predetermined number of the warrior cards is selected among warrior cards that a user owns. In the following explanation, it is assumed for the sake of easiness in understanding that one warrior card participates in the battle. The CPU 21 reads out data of a monster character that corresponds to a stage to be played by the user, among data of monster characters that are recorded in the game database 32. The CPU 21 then writes the data of the monster character in the RAM 23. Here, a value of HP of the monster character for the battle is randomly determined. For example, HP of the monster character MC1 is set in a range of 1,500 to 2,000 in the stage 1 in accordance with the monster character data, while a default value of the HP for the battle is randomly set from the range of 1,500 to 2,000. Data of the warrior card is read out from the user data and written into the RAM 23.

Figure 9:
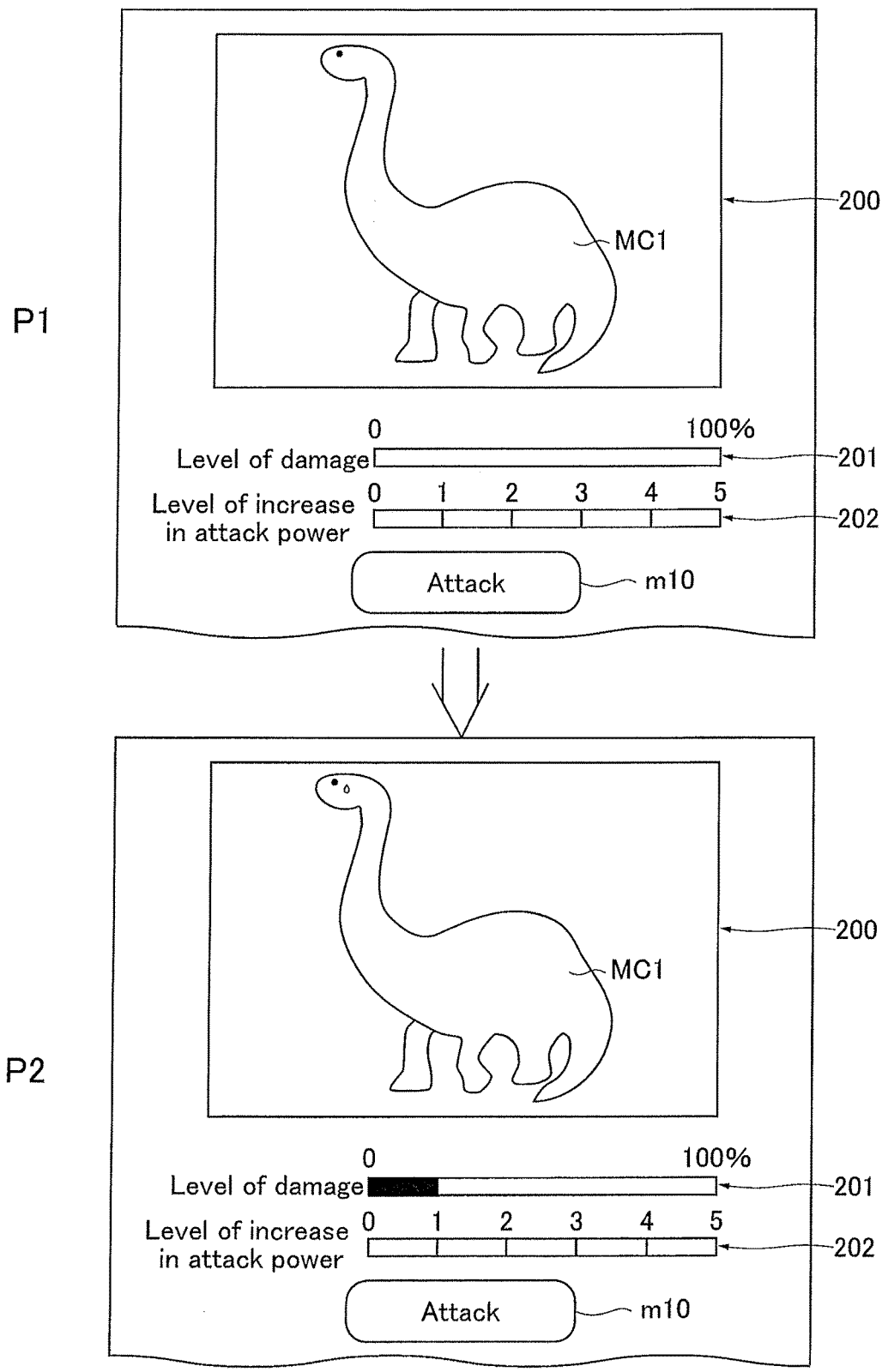
FIG. 9 illustrates an example of a series of web pages that are displayed on the communication terminal of a user.
Figure 10:
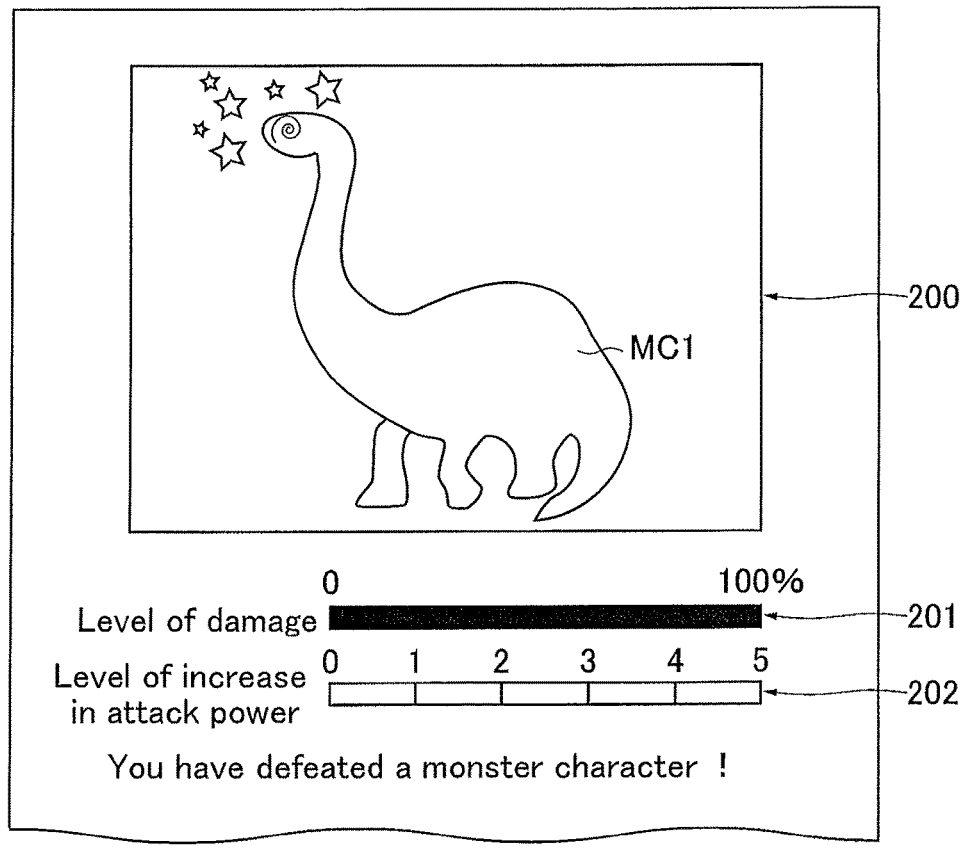
FIG. 10 illustrates an example of a series of web pages that are displayed on the communication terminal of the user.

When the user attacks the monster character using a warrior card (that is, when the button m10 on the web page P1 of FIG. 9 is selected for example), the CPU 21 decreases the HP of the monster character in accordance with a value of attack power of the warrior card. Here, the value of the attack power of the warrior card is basically fixed as illustrated in FIG. 6. Nevertheless, the attack power is increased if it is determined by the determiner 54, which is described later, that a condition has been satisfied. In the following explanation, a selection operation to the button m10 ("Attack") is referred to as "attack operation."

Let Pa stand for the attack power of the warrior card. Further, let K stand for an attack power correction factor in the case in which it is determined that the condition has been satisfied. The attack power correction factor K indicates a degree of increase in attack power. Calculation with regard to the HP of the monster character will be performed with a single attack operation in accordance with an equation (1), which is described below. Note that a value of K is "1" if the condition has not been satisfied. The updated value of the HP is sequentially overwritten into the RAM 23 while performing the battle processing.

$$HP = HP - Pa * K \qquad (1)$$

It is appreciated from the equation (1) that, if the attack power correction factor K is greater than one, the HP decreases largely and the monster character is defeated faster compared to the case of K=1.

The CPU 21 calculates a level of damage of the monster character based on the value of the HP that is sequentially updated with attack operations. Let DL (%) stand for a value of the level of damage in percent. DL is calculated in accordance with an equation (2), which is described below. In the equation (2), HP0 indicates a default value of HP of a monster character. The updated DL is sequentially overwritten into the RAM 23 while performing the battle. A position of the gauge 201 is determined based on the updated DL.

$$DL = (HP0 - HP)/HP0 * 100 \qquad (2)$$

The CPU 21 decreases stamina of the user by a predetermined value for example in response to an attack operation. That is, when recognizing the attack operation, the CPU 21 accesses to the user data to update (decrease) the stamina.

In the present example, the battle processing with regard to the battle against the monster character is performed based on the attack power of the warrior card that the user owns; however, a method of the battle processing is not limited to one described above. For example, a value that is randomly determined within a predetermined range in response to the attack operation may be applied as Pa in the equation (1) instead of the attack power of the warrior card.

If the updated HP of the monster character becomes zero, the CPU 21 proceeds to perform battle processing of the next stage for a game-playing user. That is, the CPU 21 reads out data of a monster character that corresponds to the next stage from the monster character data that is recorded in the game database 32, and loads the data of the monster character to the RAM 23.

The determiner 54 includes a function for determining whether a progression degree of the game made by friend(s) of a game-playing user has satisfied a condition. In the present embodiment, the condition is that the friend(s) have cleared five stages in the battle processing (that is, the friend(s) have defeated five monster characters). That is, the condition is determined to be satisfied every time any one of the friend(s) has cleared five stages in the battle processing.

The function of the determiner 54 will be realized as described below. The CPU 21 of the game server 20 writes data with regard to a progression degree of the game made by respective users into the game database 32. The data with regard to the progression degree of the game is information of stages that have been cleared and stages that are being played, for example. The data with regard to the progression degree of the game is updated every time the respective users have cleared a stage. The CPU 21 read data of friends of a game-playing user. Then, referring the data with regard to the progression degree of the game made by respective friends, the CPU 21 determines for each friend whether the condition has been satisfied.

The effect provider 55 includes a function for providing a game-playing user with an advantageous effect if it is determined by the determiner 54 that the condition has been satisfied. In the present embodiment, the advantageous effect is that the game-playing user can defeat a monster character faster than usual and accordingly progress the game faster.

The function of the effect provider 55 will be realized as described below. The CPU 21 of the game server 20 manages a variable M (M: Integer equal to or greater than zero) that specifies an attack power correction factor K for increasing attack power of a warrior card in a battle against a monster character. The variable M is associated with a game-playing user. The default value of the variable M is zero, while the maximum value of the variable M is ten for example. The variable M increases every time any one of friends of the game-playing user has cleared five stages and the condition has been satisfied accordingly. Increase in the variable M is exemplified in FIG. 14, though the increase may be arbitrarily set. FIG. 14 illustrates variable adjustment data indicating relation between a variable M for the game-playing user and an increase in the variable M in the case in which the condition with regard to any one of friends of the game-playing user. According to this example, the increase in the variable M is large as the variable M for the game-playing user is small, while the increase in the variable M is small as the variable M for the game-playing user is large. The variable M is decremented by one every time an attack operation is performed by the user. The example of FIG. 14 is configured such that a status in which a large value of the variable M does not last long in consideration of fairness in the game. The variable adjustment data illustrated in FIG. 14 is recorded in the ROM 22 for example.

The CPU 21 determines the attack power correction factor K of the warrior card that the user uses and a level of increase in the attack power that is indicated by the gauge 202 on a web page based on the variable M for the user. For the determination, the CPU 21 refers to attack power correction data that is exemplified in FIG. 15. As illustrated in FIG. 15, in the attack power correction data, a variable M, a rate of increase in attack power, an attack power correction factor K, and a level of increase in attack power are corresponded to each other. The attack power correction data is recorded in the ROM 22 for example. In FIG. 15, the rate of increase in attack power is a value in percent that corresponds to the attack power correction factor K. As illustrated in FIG. 15, as the variable M increases, both the attack power correction factor K and the level of increase in attack power increase together.

The attack power correction factor K based on the attack operation, which is determined based on the variable M, is used in processing to update the HP of the monster character (see the equation (1)). Every time any one of the friends of the game-playing user has cleared five stages, the variable M increases and accordingly the attack power of a warrior card that the game-playing user uses increases. Therefore, the game-playing user is provided with an advantageous effect that the HP of the monster character is zeroed and accordingly the game is progressed faster. Note that five levels 1 to 5 of increase in attack power are prepared in accordance with the variable M, that is, in accordance with the attack power correction factor K. This is because it makes the user easier to visually recognize a degree of increase in the attack power of the warrior card of the user.

The notifier 56 includes a function for notifying a game-playing user that the condition has been satisfied if it is determined by the determiner 54 that the condition has been satisfied. The notifier 56 is not a component mandatory for the present invention, but a component that is preferable for the present invention. According to the notifier 56, the game-playing user can visually or aurally recognize that he or she has been provided with the advantageous effect as a result of an accomplishment by his or her friend(s). Thereby, the game-playing user can realize that he or she is progressing the game cooperatively with the friend(s) in the game.

The function of the notifier 56 will be realized as described below. If a friend of the game-playing user has cleared five stages (that is, if it is determined that the condition has been satisfied), the CPU 21 of the game server 20 transmits a message to the communication terminal 10 of the game-playing user. The message includes information with regard to the friend (a user name of the friend for example). An example of a content of the message is illustrated in the web page P5 of FIG. 11. Alternatively, the CPU 21 generates HTML data that includes the message in response to a request for updating a web page. In the example of the web page P5 of FIG. 11, the game-playing user is notified through text data; however, the game-playing user is not only notified through visualized information. The game-playing user may be notified through voice information.

Figure 11:
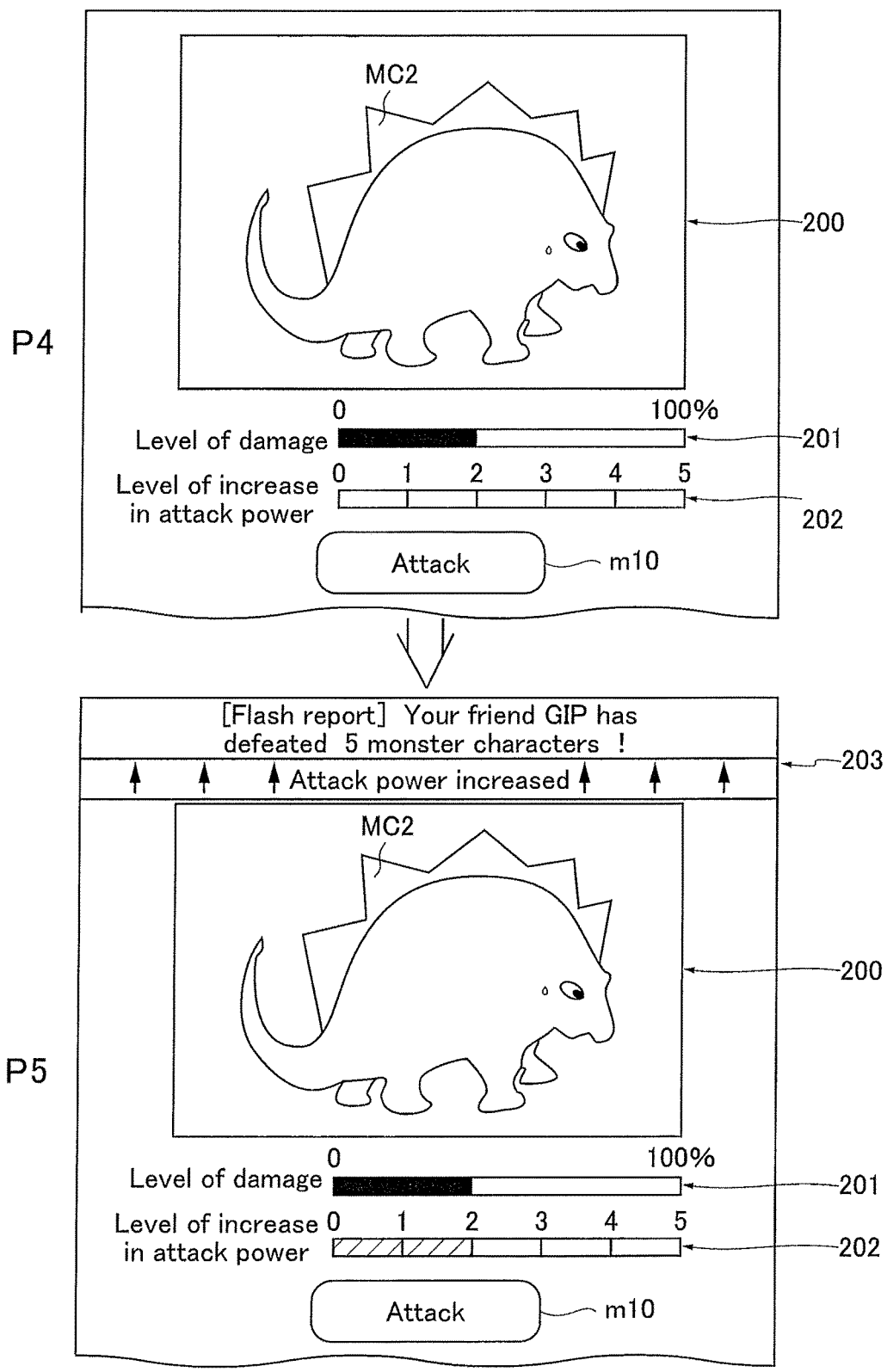
FIG. 11 illustrates an example of a series of web pages that are displayed on the communication terminal of the user.

In the following explanation, as indicated in the text area 203 of the web page P5 of FIG. 11, notification in text data that the condition has been satisfied as a result of an accomplishment by the friend is referred to as "flash report."

(7) Main processing flow of the game control device of the present embodiment

Figure 16:
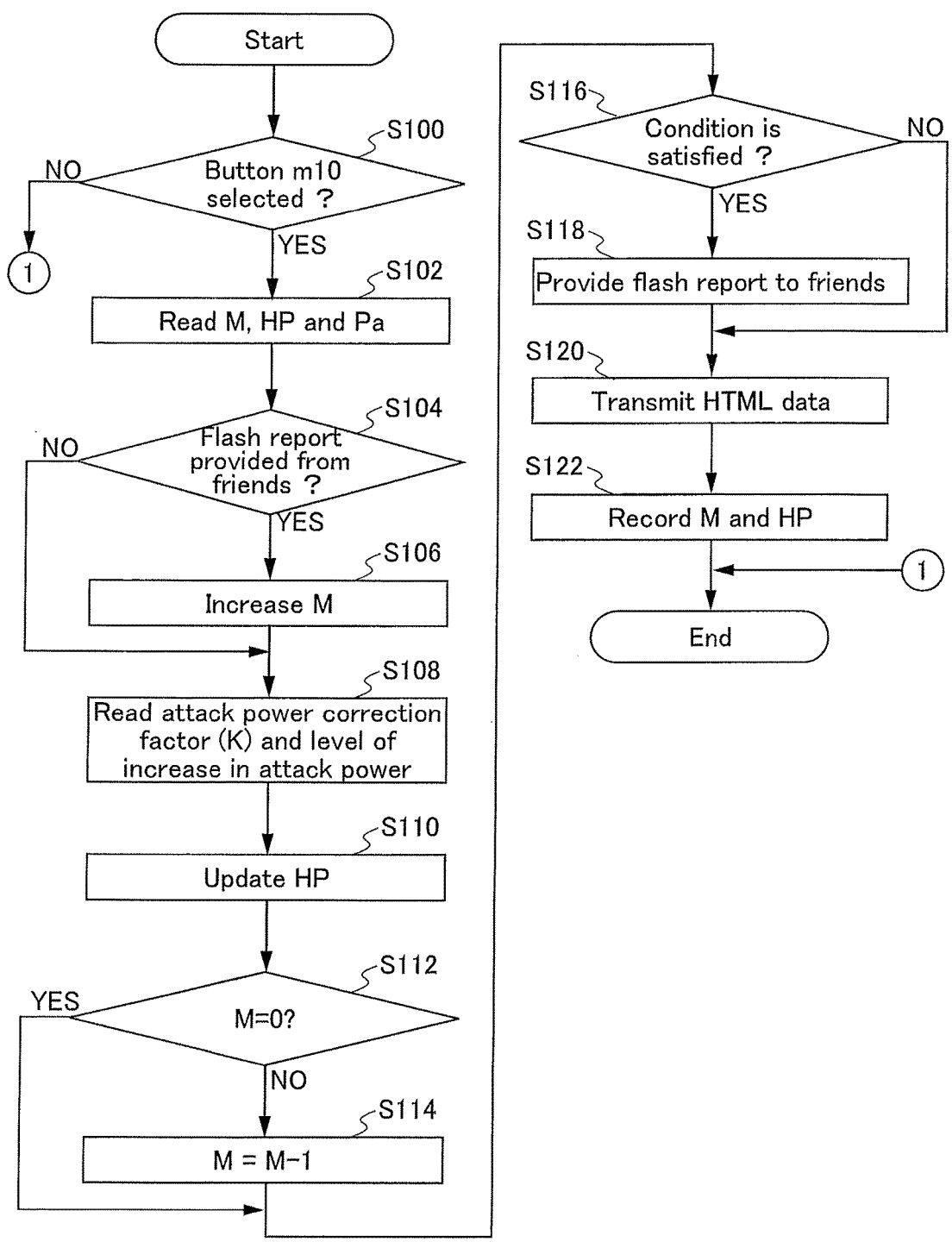
FIG. 16 is a flowchart for main processing in the game server according to the embodiment.

The following is an explanation about an example of a main processing flow performed by the game control device according to the present embodiment with reference to the flowchart of FIG. 16. The flowchart of FIG. 16, which is performed by the game control device according to the present embodiment, indicates battle processing in the game according to the present embodiment.

After recognizing that the button m10 has been selected in the web page of battle processing (that is, after recognizing an attack operation) (Step S100: YES), the CPU 21 of the game server 20 performs a series of processing since Step S102. If a selection operation to the button m10 has not been recognized (Step S100: NO), the battle processing terminates. If the Step S100 is judged to be YES, the CPU 21 first reads from the RAM 23: a variable M for a game-playing user, a HP of a monster character (an opponent in the battle) in accordance with a stage to be processed, and attack power of a warrior card that the game-playing user uses in the battle (Step S102). Next, the CPU 21 determines whether to send the game-playing user a flash report with regard to friend(s) of the game-playing user (Step S104). That is, the CPU 21 reads user data of friend(s) of the game-playing user to refer to progression degrees of respective stages for the friend(s).

The CPU 21 then determines for respective friend(s) whether a condition has been satisfied (five stages have been cleared, for example). If the condition has been satisfied with regard to any one of the friend(s), the CPU 21 decides to send a flash report from the friend(s) (Step S104: YES) and increases the variable M (Step S106). The CPU 21 increases the variable M by referring the variable adjustment data exemplified in FIG. 14. Due to the increase in variable M, the attack power of the warrior card that the game-playing user uses increases. Thus, the game-playing user can progress the battle advantageously.

If the CPU 21 decides not to send a flash report from the friend(s) (Step S104: NO), the CPU 21 does not change the variable M. Once the variable M is determined, the CPU 21 refers to the attack power correction data that is exemplified in FIG. 15, and reads an attack power correction factor K and a level of increase in the attack power (Step S108). Based on the attack power correction factor K that has been read, the CPU 21 updates the HP of the monster character according to the equation (1) (Step S110). If the variable M is not zero (Step S112: NO), the CPU 21 decrements the variable M (Step S114). That is, the variable M is decremented by one for each attack operation. If the variable M is zero (Step S112: YES), the CPU 21 skips the Step S114 to proceed to Step S116.

Next, the CPU 21 determines whether the condition has been satisfied (five stages have been cleared, for example) with regard to the game-playing user (Step S116). If the condition has been satisfied with regard to the game-playing user (Step S116: YES), the CPU 21 sends a flash report to all friends of the game-playing user (Step S118). If the condition has not been satisfied with regard to the game-playing user (Step S116: NO), the CPU 21 does not send a flash report. The CPU 21 generates HTML data in response to the attack operation in the Step S100 and transmits the HTML data to the communication terminal 10 of the game-playing user (Step S120). A web page that is displayed based on the HTML data includes the gauge 202 and the gauge 201. The level of increase in the attack power that has been read in the Step S108 is reflected in the gauge 202, while the HP that has been updated in the Step S110 is reflected in the gauge 201. Finally, the CPU 21 records the updated variable M and the updated HP of the monster character into the RAM 23 (Step S122), and terminates the battle processing.

Although not illustrated in FIG. 16, if the HP of the monster character becomes zero, the CPU 21 terminates the stage to be processed and proceeds to the next stage.

As explained above, in the game system of the present embodiment, if it is determined that a progression degree of the game made by a friend of a game-playing user has satisfied a condition, the game-playing user is provided with an advantageous effect. Thus, the game-playing user can realize that he or she can progress the game advantageously as a result of an accomplishment by the friend(s). That is, the game-playing user can realize that he or she progresses the game cooperatively with the friend(s).

In the embodiment described above, the progression degree of the game is determined based on a number of stages that the friend has cleared; however, the present invention is not limited to such example. A progression degree of a game may be arbitrarily set in accordance with nature of the game. For example, the progression degree of the game may be determined based on a number of items that have been obtained in the game or based on a number of times that specific missions in the game have been cleared, or the like. In the case in which a game is progressed in response to consecutive selection operations to a specific button (the button m10 for example) as described in the embodiment, the progression degree of the game may be determined based on a number of times of selection operation to that specific button.

In the embodiment described above, a condition that a flash report is sent from a friend may be arbitrarily set. As descried above, preferably, a game includes a plurality of stages (parts), and the condition under which a flash report is sent from a friend is that: the predetermined number of parts are played by any one of the friend(s) of the game-playing user, and execution results each satisfy a criterion for a predetermined number of stages (parts) (a monster character has been defeated to clear a stage, for example).

In the embodiment described above, the game-playing user can obtain an advantageous benefit in the game if the friend(s) of the game-playing user has cleared a predetermined number of stages. Thus, the friend(s) of the game-playing user is motivated to progress the game for the game-playing user. The friend(s) of the game-playing user is also conscious of a target (that is, to clear the predetermined number of stages, for example) in progressing the game cooperatively with his or her friend(s).

(8) Modified Examples

Battle processing is performed by use of cards in the embodiment described above; however, the present invention is not limited to one by use of cards. Objects other than cards may be applied instead of cards. Alternatively, battle processing may be performed without use of objects such as cards.

(8-1) Modified Example 1

In the embodiment described above, the effect provider 55 may increase the advantageous effect as a number of stages that friend(s) of a game-playing user have cleared (that is, a number of parts depending on execution results that each satisfy the criterion) increases. For example, increase of the advantageous effect corresponds to increase of an attack power correction factor K of a warrior card of the game-playing user in the embodiment described above.

With this configuration, as a number of friends of the game-playing user increases, the game-playing user enjoys a synergy effect that: opportunities to be provided with the advantageous effect based on progression degrees of many friends increases; and the advantageous effect based on the number of the friends increases. Therefore, the game-playing user is motivated to voluntarily make as many friends as possible.

In order to realize the present modified example, correlation data is recorded in the ROM 22 for example. Correlated in the correlation data are: a number of stages that a friend of the game-playing user have cleared, and an attack power correction factor K of a warrior card. The correlation data is configured such that the attack power correction factor K is greater as the number of stages that have been cleared by a friend of the game-playing user increases. The CPU 21 refers to the correlation data in the ROM 22 to find an attack power correction factor K of a warrior card of the game-playing user. Alternatively, the CPU 21 may calculate an attack power correction factor K of the warrior card of the game-playing user based on a function that describes a relation between a number of stages that a friend of the game-playing user has cleared and an attack power correction factor K of a warrior card.

If the game-playing user has a plurality of friends, the determiner 54 may find a specific friend whose progression degree of the game is the greatest among the plurality of friends, and determines whether the progression degree of the game made by that specific friend has satisfied a condition. For example, the determiner 54 may find an attack power correction factor K with reference to a specific friend who has cleared the most stages among the plurality of friends. Alternatively, if the game-playing user has a plurality of friends, the determiner 54 may calculate an average of progression degrees of the game among the plurality of friends, and determines whether the average has satisfied a condition.

(8-2) Modified Example 2

A condition under which the flash report is sent is not limited to one in the embodiment described above, that is, a condition that is determined on a basis of a progression degree of stages in the game made by any one of friends of the game-playing user. In the case in which the game includes a plurality of stages (namely, parts), the condition may be one based on a total number of stages that respective friends have cleared (that is, a total number of parts depending on execution results that each satisfy the criterion).

With this configuration, determination is not performed based on a progression degree made by a single friend of the game-playing user, but is performed based on progression degrees made by all friends of the game-playing user. That is, the game-playing user can obtain an advantageous benefit in the game if the total number of the stages that the friends of the game-playing user have cleared reaches a predetermined value. The condition is not very difficult for each friend to satisfy, and thus each friend is motivated to progress the game for the benefit of the game-playing user such that an execution result of even single stage satisfies the criterion.

In order to realize the present modified example, a counter is provided for each user. The counter counts up every time any one of the friends of each user has cleared a stage. A value of the counter that is provided for the game-playing user corresponds to the total number of the stages that the friends of the game-playing user have cleared. If the value of the counter reaches a predetermined value, the CPU 21 then performs processing for providing the game-playing user with the advantageous effect.

(8-3) Modified Example 3

In the game control device according to the modified example 2 described above, the advantageous effect may be increased as the total number of the stages that the respective friends of a game-playing user have cleared (that is, a total number of parts depending on execution results that each satisfy the criterion) increases. For example, increase of the advantageous effect corresponds to increase of an attack power correction factor K of a warrior card of the game-playing user in the embodiment described above.

With this configuration, as the number of the friends of the game-playing user increases, the game-playing user enjoys a synergy effect that: opportunities to be provided with the advantageous effect based on progression degrees of many friends increases; and the advantageous effect based on the number of the friends increases. Therefore, the game-playing user is motivated to voluntarily make as many friends as possible.

In order to realize the present modified example, correlation data is recorded in the ROM 22 for example. Correlated in the correlation data are: a number of stages that friend(s) of the game-playing user have cleared, and an attack power correction factor K of a warrior card. The correlation data is configured such that the attack power correction factor K is greater as the number of stages that have been cleared by a friend of the game-playing user increases. The CPU 21 refers to the correlation data in the ROM 22 to find an attack power correction factor K of the warrior card of the game-playing user. Alternatively, the CPU 21 may calculate an attack power correction factor K of the warrior card of the game-playing user based on a function that describes a relation between a number of stages that a friend of the game-playing user has cleared and an attack power correction factor K of a warrior card.

(8-4) Modified Example 4

In the embodiment described above, degree of intimacy obtainer 57 may be provided for obtaining a degree of intimacy between friends (that is, a user and other user who associated with the user by the associator 52). Further, a condition under which a flash report is sent may be modified in accordance with the degree of intimacy that is obtained by the degree of intimacy obtainer 57. The degree of intimacy that is obtained is one between a game-playing user and other users who are associated with the game-playing user. For example, the degree of intimacy may be set as high when a specific value increases. Such specific value may be: a frequency of transmission and reception with regard to cheering messages between friends; a number of times of transmission and reception with regard to presents such as items in the game; a number of times of battles that are played between friends in the case in which the battles are prepared in the game; or the like. With this configuration, as the degree of intimacy becomes high, the condition becomes relaxed. Thereby, opportunities increase in which the condition has been satisfied with regard to friend(s) whose degree of intimacy with the game-playing user is high. Opportunities also increase in which the game-playing user is provided with the advantageous effect as a result of an accomplishment by friend(s) of the game-playing user. Then, the game-playing user is motivated to increase the degree of intimacy with the friend(s). Consequently, communication between the game-playing user and the friend(s) becomes more active.

In order to realize the present modified example, the CPU 21 of the game server 20 counts a frequency of transmission and reception with regard to cheering messages between friends or a number of times of transmission and reception between friends with regard to presents such as items in the game, etc. For example, correlation data is recorded in the ROM 22. In the correlation data, a count result and a degree of intimacy are correlated. The CPU 21 refers to the correlation data to set and update a degree of intimacy between a user to be processed and friends of the user. Here, it is configured such that the condition is more relaxed as the degree of intimacy is high. For example, a game-playing user may receive a flash report if a friend whose degree of intimacy with the game-playing user is low has cleared five stages, while the game-playing user may receive a flash report if a friend whose degree of intimacy with the game-playing user is high have cleared three stages. The CPU 21 correlates a degree of intimacy with a number of stages to be cleared that satisfies a condition. The CPU 21 then determines whether a progression degree of respective friends of the game-playing user has satisfied the condition.

The exemplary embodiment of the present invention has been explained in detail. However, the present invention is not limited to the aforementioned exemplary embodiment. Further, it is apparent that a variety of changes and modifications can be made for the exemplary embodiment without departing from the scope of the present invention. For example, technical matters that are described in the embodiment and the modified examples may be combined.

In the embodiment and the modified examples described above, an advantageous effect in the game that the game-playing user is provided with is to increase an attack power correction factor K of a warrior card; however, the present invention is not limited to this example. An advantageous effect in the game that the game-playing user is provided with may be set with or without reference to the battle processing. In the case in which the advantageous effect is set with reference to the battle processing, the advantageous effect may be participation of a warrior card of the friend in a battle of the game-playing user against a monster character to support the game-playing user. Thereby, a number of warrior cards that the game-playing user uses in the battle increases and accordingly attack power of the warrior cards increases. This leads to the equivalent effect to increase in an attack power correction factor K of the warrior card that game-playing user uses in the battle. Meanwhile, in the case in which the advantageous effect is set without reference to the battle processing, the advantageous effect may be that the game-playing user is provided with an item in the game, or may be that probability of the game-playing user being provided with an item in the game increases.

While an example has been described in which a social network game is realized, the game for which the present invention may be applied is not limited to the social network game. For example, an online game system may be applied in which a server device on a network and a home online game machine are connected. With such online game system, progress of the game can be controlled in the same way as the embodiments described above.

In the embodiments described above, respective functions of the associator 52, the game executor 53, the determiner 54, the effect provider 55, and the notifier 56 are configured to be realized by the game server 20 and the database server 30 on a network; however, the present invention is not limited to such configuration. All of the means may be configured to be realized by the communication terminal 10, or a portion of the means may be configured to be realized by the communication terminal 10. Because the communication terminal 10 and the game server 20 may involve the substantially same hardware configuration, the functions can be also realized by the communication terminal 10 as described in the above embodiments.

Figure 17A:
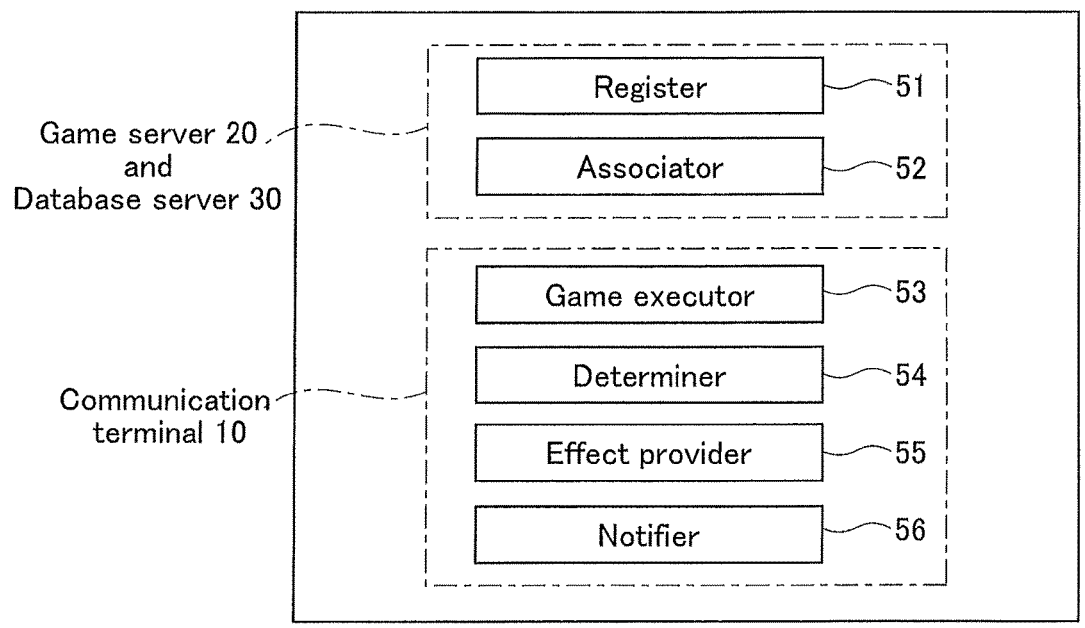
FIG. 17A is a functional block diagram for explaining functions that play main rolls in the game control device according to a modified example of the embodiment.
Figure 17B:
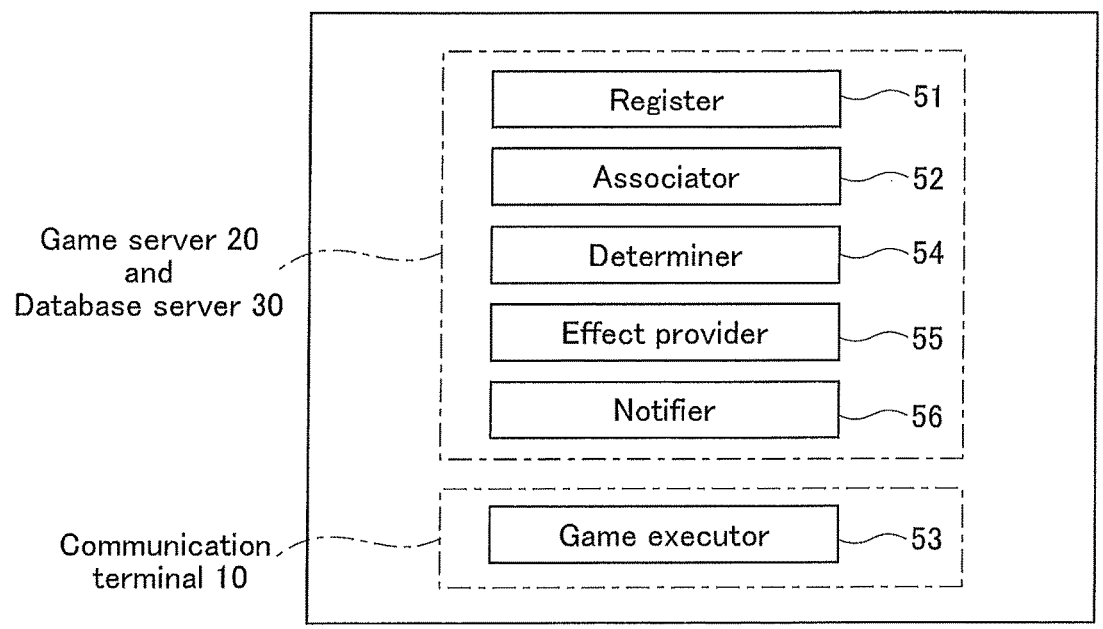
FIG. 17B is a functional block diagram for explaining functions that play main rolls in the game control device according to a modified example of the embodiment.

Although the variable adjustment data and the attack power correction data are recorded in the ROM 22 while the monster character data is recorded in the game database 32, those data may be recorded in the ROM 12 or a HDD (Hard Disk Drive; not shown) of the communication terminal 10 alternatively. FIGS. 17A and 17B each illustrates an example of configuration in which the functions of the game control device of the present embodiment are shared between the communication terminal 10, and the game server 20 and the database server 30.

<Appendix>

Aspects of the present invention are disclosed hereinafter.

A first aspect of the present invention is a game control device including:

an associator configured to associate a game-playing user with one or more users;

a game executor configured to execute a game for the game-playing user;

a determiner configured to determine whether a progression degree of the game made by the one or more users satisfies a condition; and an effect provider configured to provide the game-playing user with an advantageous effect if it is determined by the determiner that the condition has been satisfied.

In this game control device, the game-playing user, namely a game-playing user, can be provided with the advantageous effect if a progression degree of the game satisfies a condition. Here, the progression degree of the game is one made by a user (referred to as "friend" hereinafter) who is associated with the game-playing user. Thus, the game-playing user can realize that he or she can progress the game advantageously as a result of an accomplishment by the friend. That is, the game-playing user can realize that he or she progresses the game cooperatively with the friend. The progression degree of the game may be defined arbitrarily based on nature of the game. For example, the progression degree of the game may be set based on: a number of items obtained in the game, a number of times of achieving a specific mission provided in the game, or a number of times of selecting a specific button on a game screen.

In this game control device, the game includes a plurality of parts, and the condition is that execution results each satisfy a criterion for a predetermined number of parts, the predetermined number of parts being configured to be played by any one of the one or more users.

With this configuration, if execution results each satisfy a criterion for a predetermined number of parts (if a predetermined number of stages are cleared in a game, for example), the game-playing user can obtain an advantageous benefit. Thus, the friend of the game-playing user is motivated to progress the game for the game-playing user. The friend of the game-playing user is also conscious of a target (to clear a predetermined number of stages, for example) in progressing the game cooperatively with his or her friend(s).

In this game control device, the effect provider is configured to enhance the advantageous effect as a number of parts increases, the number of parts depending on the execution results that each satisfy the criterion, the number of parts being configured to be played by any one of the one or more users.

With this configuration, as a number of friends of the game-playing user increases, the game-playing user enjoys a synergy effect that: opportunities to be provided with the advantageous effect based on progression degrees of many friends increases; and the advantageous effect based on the number of the friends increases. Therefore, the game-playing user is motivated to voluntarily make as many friends as possible.

In this game control device, the game includes a plurality of parts, and the condition is that execution results each satisfy a criterion for a total number of parts, the total number of parts being configured to be played by the one or more users.

With this configuration, determination by the determiner is not performed based on a progression degree made by a single friend of the game-playing user, but is performed based on progression degrees made by all friends of the game-playing user. That is, the game-playing user can obtain an advantageous benefit in the game if execution results of the parts played by all friends of the game-playing user satisfies a condition (if a total number of the parts that the friends of the game-playing user have cleared reaches a predetermined value, for example). Then, the condition is not very difficult for each friend to satisfy, and thus each friend is motivated to progress the game for the benefit of the game-playing user such that an execution result of even single part satisfies the criterion.

In this game control device, the effect provider is configured to enhance the advantageous effect as the total number of parts increases, the total number of parts depending on the execution results that each satisfy the criterion, the total number of parts being configured to be played by the one or more users.

With this configuration, as a number of friends of the game-playing user increases, the game-playing user enjoys a synergy effect that: opportunities to be provided with the advantageous effect based on progression degrees of many friends increases; and the advantageous effect based on the number of the friends increases. Therefore, the game-playing user is motivated to voluntarily make as many friends as possible.

The game control device may further include a degree of intimacy obtainer configured to obtain a degree of intimacy between the gaming-play user and the one or more users associated by the associator, wherein the condition is modified based on the degree of intimacy between the game-playing user and the one or more users associated with the game-playing user, the degree of intimacy between the game-playing user and the one or more users associated with the game-playing user being obtained by the degree of intimacy obtainer.

The degree of intimacy may be set as high when a specific value increases. For example, such specific value may be: a frequency of transmission and reception with regard to cheering messages between friends; a number of times of transmission and reception with regard to presents such as items in the game; a number of times of battles that are played between friends in the case in which the battles are prepared in the game. With this configuration, as the degree of intimacy becomes high, the condition becomes relaxed. Thereby, opportunities increase in which the condition has been satisfied with regard to friend(s) whose degree of intimacy with the game-playing user is high. Opportunities also increase in which the game-playing user is provided with the advantageous effect as a result of an accomplishment by friend(s) of the game-playing user. Then, the game-playing user is motivated to increase the degree of intimacy with the friend(s). Consequently, communication between friends becomes more active.

The game control device may further include a notifier configured to notify the game-playing user that the condition has been satisfied if it is determined by the determiner that the condition has been satisfied.

With the notifier, the game-playing user can visually or aurally recognize that he or she has been provided with the advantageous effect as a result of an accomplishment by his or her friend(s). Thereby, the game-playing user can realize that he or she is progressing the game cooperatively with the friend(s) in the game.

A second aspect of the present invention is a game control method including:
associating a game-playing user with one or more users;
executing a game for the game-playing user;
determining whether a progression degree of the game made by the one or more users satisfies a condition; and
providing the game-playing user with an advantageous effect if it is determined by said determining that the condition has been satisfied.

A third aspect of the present invention is a non-transitory computer-readable recording medium containing a program for enabling a computer to perform a method, the method including:
associating a game-playing user with one or more users;
executing a game for the game-playing user;
determining whether a progression degree of the game made by the one or more users satisfies a condition; and
providing the game-playing user with an advantageous effect if it is determined by said determining that the condition has been satisfied.

The program described above may be stored in a computer-readable information storage medium, such as DVD-ROM and CD-ROM.

A fourth aspect of the present invention is a game system including a communication terminal and a server, the server configured to be accessible from the communication terminal, the server controlling game execution through the communication terminal, the game system including:
an associator configured to associate a game-playing user with one or more users;
a game executor configured to execute a game for the game-playing user;
a determiner configured to determine whether a progression degree of the game made by the one or more users satisfies a condition; and
an effect provider configured to provide the game-playing user with an advantageous effect if it is determined by the determiner that the condition has been satisfied.

What is claimed is:

1. A game control device comprising:
an associator configured to operate a processor to associate a game-playing user with one or more users;
a game executor configured to operate the processor to execute a game for the game-playing user;
a determiner configured to operate the processor to evaluate execution of the game by the one or more of the users to determine whether a progression degree of the game made by at least one of the one or more users satisfies a condition; and
an effect provider configured to operate the processor, in response to the determiner determining that the condition has been satisfied, to automatically provide the game-playing user with an image, the image including: a modification to at least one parameter that is usable by the game-playing user to affect an ability of the game-playing user to play the game to expedite progression of the game; and information for identifying a user who has satisfied the condition among the one or more users, the effect provider automatically providing the image in such a manner to indicate that the modification to the at least one parameter and the user who has satisfied the condition are related to each other.

2. A game control device according to claim 1, wherein the game includes a plurality of parts, and the condition is that execution results each satisfy a criterion for a predetermined number of parts, the predetermined number of parts being configured to be played by any one of the one or more users.

3. A game control device according to claim 2, wherein the effect provider is configured to automatically provide the game-playing user with the modification to at least one parameter as a number of parts increases, the number of parts depending on the execution results that each satisfy the criterion, the number of parts being configured to be played by any one of the one or more users.

4. A game control device according to claim 1, wherein the game includes a plurality of parts, and the condition is that execution results each satisfy a criterion for a total number of parts, the total number of parts being configured to be played by the one or more users.

5. A game control device according to claim 4, wherein the effect provider is configured to automatically provide the game-playing user with the modification to at least one parameter as the total number of parts increases, the total number of parts depending on the execution results that each satisfy the criterion, the total number of parts being configured to be played by the one or more users.

6. A game control device according to claim 1, further comprising
a degree of intimacy obtainer configured to obtain a degree of intimacy between the gaming-play user and the one or more users associated by the associator,
the condition being modified based on the degree of intimacy between the game-playing user and the one or more users associated with the game-playing user, the degree of intimacy between the game-playing user and the one or more users associated with the game-playing user being obtained by the degree of intimacy obtainer.

7. A game control device according to claim 1, further comprising
a notifier configured to notify the game-playing user that the condition has been satisfied if it is determined by the determiner that the condition has been satisfied.

8. A game control method comprising:
associating, by operation of a processor, a game-playing user with one or more users;
executing, by the processor, a game for the game-playing user;
determining, by operating the processor to evaluate execution of the game by the one or more of the users, whether a progression degree of the game made by at least one of the one or more users satisfies a condition; and
providing, automatically by the processor in response to the determining that the condition has been satisfied, the game-playing user with an image, the image including: a modification to at least one parameter that is usable by the game-playing user to affect an ability of the game-playing user to play the game to expedite progression of the game; and information for identifying a user who has satisfied the condition among the one or more users, the image being automatically provided in such a manner to indicate that the modification to the at least one parameter and the user who has satisfied the condition are related to each other.

9. A non-transitory computer-readable recording medium containing a program for enabling a computer to perform a method, the method comprising:
associating, by operation of the computer, a game-playing user with one or more users;
executing, by the computer, a game for the game-playing user;
determining, by operating the computer to evaluation execution of the game by the one or more of the users, whether a progression degree of the game made by at least one of the one or more users satisfies a condition; and
providing, automatically by the computer in response to the determining that the condition has been satisfied, the game-playing user with an image, the image including: a modification to at least one parameter that is usable by the game-playing user to affect an ability of the game-playing user to play the game to expedite progression of the game; and information for identifying a user who has satisfied the condition among the one or more users, the image being automatically provided in such a manner to indicate that the modification to the at least one parameter and the user who has satisfied the condition are related to each other.

10. A game system including a communication terminal and a server, the server configured to be accessible from the communication terminal, the server controlling game execution through the communication terminal, the game system comprising:
an associator configured to operate a processor to associate a game-playing user with one or more users;
a game executor configured to operate the processor to execute a game for the game-playing user;
a determiner configured to operate the processor to evaluate execution of the game by the one or more of the users to determine whether a progression degree of the game made by at least one of the one or more users satisfies a condition; and
an effect provider configured to operate the processor, in response to the determiner determining that the condition has been satisfied, to automatically provide the game-playing user with an image, the image including: a modification to at least one parameter that is usable by the game-playing user to affect an ability of the game-playing user to play the game to expedite progression of the game; and information for identifying a user who has satisfied the condition among the one or more users, the effect provider automatically providing the image in such a manner to indicate that the modification to the at least one parameter and the user who has satisfied the condition are related to each other.

* * * * *